US010180959B2

(12) United States Patent
Befort et al.

(10) Patent No.: US 10,180,959 B2
(45) **Date of Patent: *Jan. 15, 2019**

(54) COMPONENT INDEPENDENT PROCESS INTEGRATION MESSAGE SEARCH

(71) Applicant: SAP SE, Walldorf (DE)

(72) Inventors: Waldemar Befort, Hockenheim (DE); Sharath Chandra Pilli, Hyderabad (IN); Steffen Henning, Malsch (DE)

(73) Assignee: SAP SE, Walldorf (DE)

( * ) Notice: Subject to any disclaimer, the term of this patent is extended or adjusted under 35 U.S.C. 154(b) by 75 days.

This patent is subject to a terminal disclaimer.

(21) Appl. No.: 15/606,908

(22) Filed: May 26, 2017

(65) Prior Publication Data

US 2017/0262497 A1 Sep. 14, 2017

Related U.S. Application Data

(63) Continuation of application No. 13/299,155, filed on Nov. 17, 2011, now Pat. No. 9,679,009.

(51) Int. Cl.
*G06F 17/30* (2006.01)
*G06Q 10/06* (2012.01)

(52) U.S. Cl.
CPC ....... *G06F 17/30398* (2013.01); *G06Q 10/06* (2013.01)

(58) Field of Classification Search
CPC ......... G06F 17/30867; G06F 17/30722; G06F 17/30424; G06F 17/30525;
(Continued)

(56) References Cited

U.S. PATENT DOCUMENTS 5,822,523 A * 10/1998 Rothschild ............ H04L 12/185 709/236
6,985,909 B2 1/2006 Blohm
(Continued)

OTHER PUBLICATIONS

"Configuring User-Defined Message Search," [online], <http://help.sap.conn/saphelp_nw73/helpdata/en/48/b2e0186b156ff4e10000000a42189b/content.htm>, retrieved Nov. 17, 2011, 2 pages.

(Continued)

*Primary Examiner* — Ashish Thomas
*Assistant Examiner* — Rezwanul Mahmood
(74) *Attorney, Agent, or Firm* — Fish & Richardson P.C.

(57) ABSTRACT

The present disclosure involves systems, software, and computer implemented methods for centralized message searching of business processes. One process includes identifying a process integration (PI) domain associated with a message search, where the PI domain includes at least one PI component, and receiving a set of user-defined search attributes for searching messages within the identified PI domain, where each search attribute associated with a corresponding value. At least one message corresponding to the set of the received user-defined search attributes associated with at least one PI component is identified, and information associated with the identified at least one message corresponding to at least a portion of the set of received search attributes is retrieved. At least a portion of the retrieved information associated with the identified at least one message is presented via a user interface.

20 Claims, 22 Drawing Sheets

(58) Field of Classification Search
CPC ......... G06F 17/30554; G06F 17/30634; G06F 17/30398; G06F 17/30864; G06F 17/30902
See application file for complete search history.

(56) References Cited

U.S. PATENT DOCUMENTS

| | | | | | |
|---|---|---|---|---|---|
| 7,203,695 | B2 | 4/2007 | Hoffschulz et al. | | |
| 7,536,412 | B2 | 5/2009 | Blohm | | |
| 7,603,260 | B2 | 10/2009 | Schmitz et al. | | |
| 7,617,462 | B2 * | 11/2009 | Budzisch | H04L 43/0817 | 715/736 |
| 7,721,256 | B2 | 5/2010 | Petev et al. | | |
| 7,734,763 | B2 * | 6/2010 | Budzisch | H04L 67/025 | 709/223 |
| 7,739,387 | B2 * | 6/2010 | Eberlein | H04L 67/02 | 709/226 |
| 7,925,699 | B2 * | 4/2011 | Sala | G06Q 30/00 | 709/204 |
| 8,056,091 | B2 | 11/2011 | Brunswig et al. | | |
| 8,086,726 | B2 * | 12/2011 | Hofmann | G06Q 10/06 | 370/242 |
| 8,095,598 | B2 * | 1/2012 | Follmeg | G06Q 10/10 | 709/204 |
| 8,769,086 | B2 | 7/2014 | Befort et al. | | |
| 8,924,269 | B2 * | 12/2014 | Seubert | G06Q 10/06 | 705/35 |
| 8,949,403 | B1 * | 2/2015 | Budzisch | G06F 11/3003 | 709/203 |
| 9,135,093 | B2 * | 9/2015 | Boller | G06F 9/542 | |
| 9,489,649 | B2 * | 11/2016 | Hrastnik | G06Q 10/10 | |
| 9,530,115 | B2 * | 12/2016 | Klemenz | G06Q 10/10 | |
| 9,679,009 | B2 * | 6/2017 | Befort | G06Q 10/06 | |
| 2001/0044899 | A1 * | 11/2001 | Levy | G06F 17/30876 | 713/176 |
| 2003/0084039 | A1 * | 5/2003 | Balogh | G06F 9/505 | |
| 2003/0133552 | A1 * | 7/2003 | Pillai | H04M 15/00 | 379/114.2 |
| 2005/0021976 | A1 * | 1/2005 | Trossen | H04L 63/10 | 713/182 |
| 2007/0226295 | A1 * | 9/2007 | Haruna | G06F 17/30722 | 709/204 |
| 2009/0119280 | A1 * | 5/2009 | Waters | H04W 4/60 | 707/999.003 |
| 2009/0235276 | A1 * | 9/2009 | Hofmann | G06F 9/542 | 719/313 |
| 2010/0082497 | A1 * | 4/2010 | Biesemann | G06Q 10/06 | 705/301 |
| 2011/0307490 | A1 * | 12/2011 | Chow | G06F 17/30867 | 707/741 |
| 2012/0011237 | A1 * | 1/2012 | Bagwandeen | G06F 19/3406 | 709/223 |
| 2012/0030275 | A1 | 2/2012 | Boller et al. | | |
| 2012/0054334 | A1 | 3/2012 | Befort | | |
| 2012/0144246 | A1 * | 6/2012 | Dreyfoos | G06F 11/302 | 714/47.1 |
| 2012/0144251 | A1 | 6/2012 | Carey et al. | | |
| 2012/0290705 | A1 * | 11/2012 | Befort | G06Q 10/06 | 709/224 |
| 2013/0132419 | A1 * | 5/2013 | Befort | G06Q 10/06 | 707/769 |
| 2013/0283291 | A1 * | 10/2013 | Balko | G06F 9/546 | 719/313 |
| 2014/0068629 | A1 * | 3/2014 | Boller | G06F 9/542 | 719/313 |
| 2017/0262497 | A1 * | 9/2017 | Befort | G06Q 10/06 | |

OTHER PUBLICATIONS

"SAP NetWeaver Process Integration," Wikipedia, [online], <http://en.wikipedia.org/wiki/SAP_NetWeaver_Process_Integration>, retrieved Nov. 17, 2011, 2 pages.

* cited by examiner

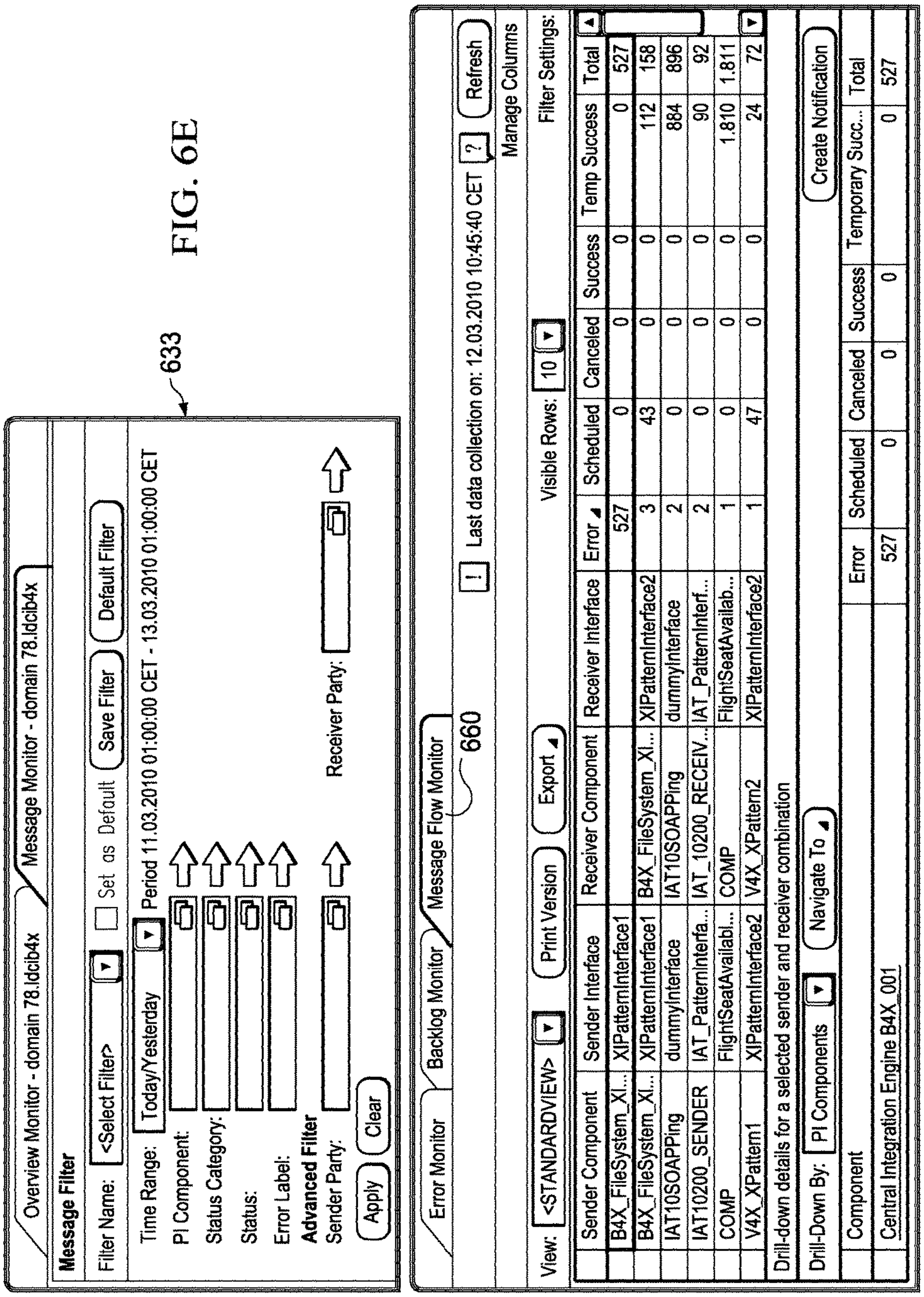

FIG. 6E

Message Filter

Overview Monitor - domain 78.ldcib4x | Message Monitor - domain 78.ldcib4x

Filter Name: <Select Filter>  ☐ Set as Default  [Save Filter] [Default Filter]

Time Range: Today/Yesterday ▼  Period 11.03.2010 01:00:00 CET - 13.03.2010 01:00:00 CET
PI Component: ⇧
Status Category: ⇧
Status: ⇧
Error Label: ⇧

Advanced Filter
Sender Party:   Receiver Party: ⇧

[Apply] [Clear]

— 633

---

Error Monitor | Backlog Monitor | Message Flow Monitor

View: <STANDARDVIEW> ▼  [Print Version] [Export ▼]  — 660  ☐  Last data collection on: 12.03.2010 10:45:40 CET  ?  [Refresh]

Visible Rows: 10 ▼     Manage Columns   Filter Settings:

| Sender Component | Sender Interface | Receiver Component | Receiver Interface | Error | Scheduled | Canceled | Success | Temp Success | Total |
|---|---|---|---|---|---|---|---|---|---|
| B4X_FileSystem_XI... | XIPatternInterface1 | | | 527 | | 0 | 0 | 0 | 527 |
| B4X_FileSystem_XI... | XIPatternInterface1 | B4X_FileSystem_XI... | XIPatternInterface2 | 3 | 43 | 0 | 0 | 112 | 158 |
| IAT10SOAPPing | dummyInterface | IAT10SOAPPing | dummyInterface | 2 | 0 | 0 | 0 | 884 | 896 |
| IAT10200_SENDER | IAT_PatternInterfa... | IAT_10200_RECEIV... | IAT_PatternInterf... | 2 | 0 | 0 | 0 | 90 | 92 |
| COMP | FlightSeatAvailabl... | COMP | FlightSeatAvailab... | 1 | 0 | 0 | 0 | 1,810 | 1,811 |
| V4X_XPattern1 | XIPatternInterface2 | V4X_XPattern2 | XIPatternInterface2 | 1 | 47 | 0 | 0 | 24 | 72 |

Drill-down details for a selected sender and receiver combination

Drill-Down By: PI Components ▼  [Navigate To ▼]    [Create Notification]

| Component | Error | Scheduled | Canceled | Success | Temporary Succ... | Total |
|---|---|---|---|---|---|---|
| Central Integration Engine B4X_001 | 527 | 0 | 0 | 0 | 0 | 527 |

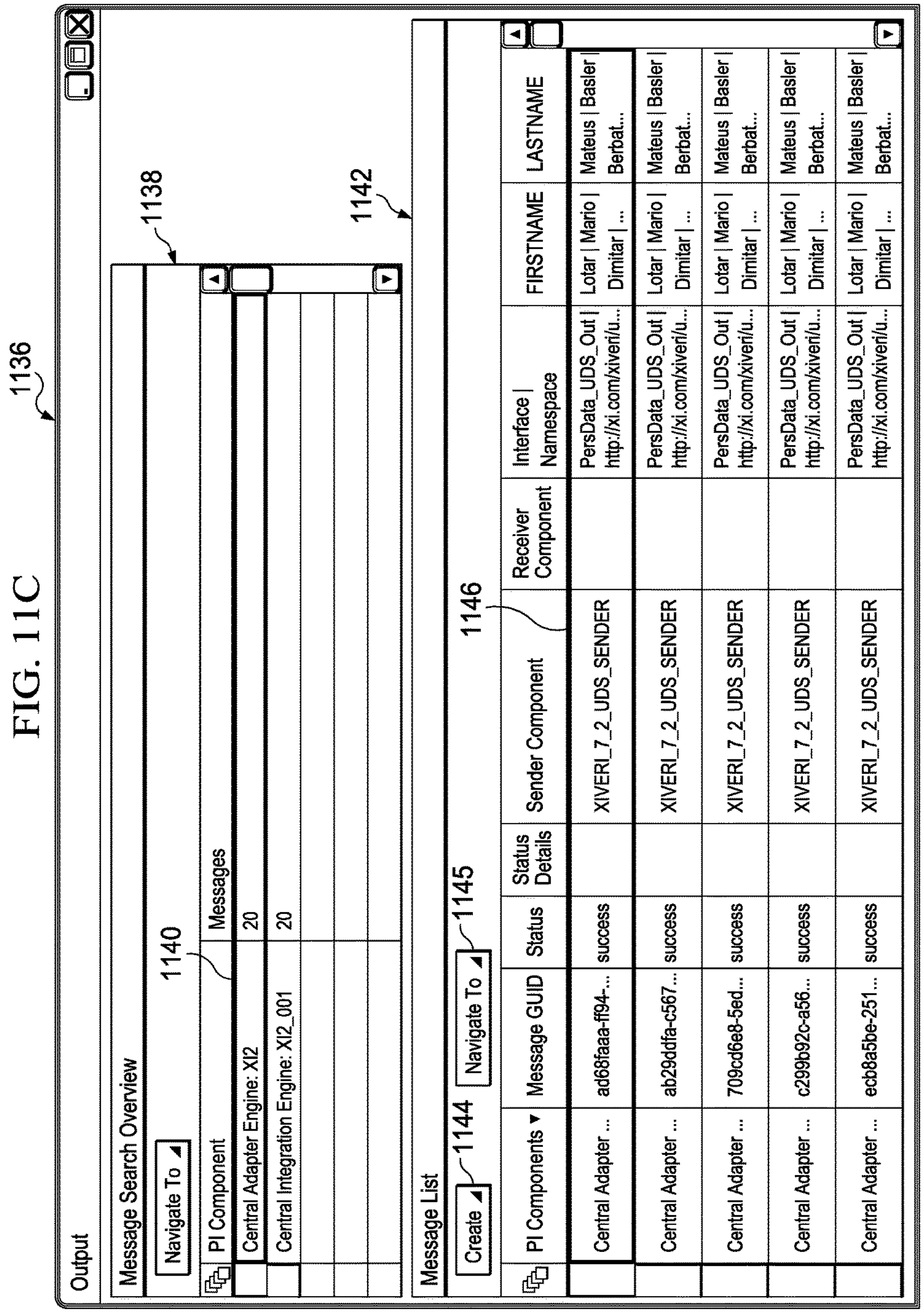

FIG. 11C

| Output | | | | | | | |
|---|---|---|---|---|---|---|---|
| **Message Search Overview** ～1136 | | | | | | | |
| Navigate To ▾ ～1140 | | | | | | ～1138 | |
| PI Component | Messages | | | | | | |
| Central Adapter Engine: XI2 | 20 | | | | | | |
| Central Integration Engine: XI2_001 | 20 | | | | | ～1142 | |
| **Message List** | | | | | | | |
| Create ▾ ～1144 | Navigate To ▾ ～1145 | | | ～1146 | | | |
| PI Components ▾ | Message GUID | Status | Status Details | Sender Component | Receiver Component | Interface \| Namespace | FIRSTNAME | LASTNAME |
| Central Adapter ... | ad68faaa-ff94-... | success | | XIVERI_7_2_UDS_SENDER | | PersData_UDS_Out \| http://xi.com/xiveri/u... | Lotar \| Mario \| Dimitar \| ... | Mateus \| Basler \| Berbat... |
| Central Adapter ... | ab29ddfa-c567-... | success | | XIVERI_7_2_UDS_SENDER | | PersData_UDS_Out \| http://xi.com/xiveri/u... | Lotar \| Mario \| Dimitar \| ... | Mateus \| Basler \| Berbat... |
| Central Adapter ... | 709cd6e8-5ed... | success | | XIVERI_7_2_UDS_SENDER | | PersData_UDS_Out \| http://xi.com/xiveri/u... | Lotar \| Mario \| Dimitar \| ... | Mateus \| Basler \| Berbat... |
| Central Adapter ... | c299b92c-a56... | success | | XIVERI_7_2_UDS_SENDER | | PersData_UDS_Out \| http://xi.com/xiveri/u... | Lotar \| Mario \| Dimitar \| ... | Mateus \| Basler \| Berbat... |
| Central Adapter ... | ecb8a5be-251... | success | | XIVERI_7_2_UDS_SENDER | | PersData_UDS_Out \| http://xi.com/xiveri/u... | Lotar \| Mario \| Dimitar \| ... | Mateus \| Basler \| Berbat... |

COMPONENT INDEPENDENT PROCESS INTEGRATION MESSAGE SEARCH

CLAIM OF PRIORITY

This application claims priority under 35 USC § 119(e) to U.S. patent application Ser. No. 13/299,155, filed on Nov. 17, 2011, the entire contents of which are hereby incorporated by reference.

TECHNICAL FIELD

The present disclosure relates to software, computer systems, and computer implemented methods for providing centralized process integration (PI) domain monitoring and message searching.

BACKGROUND

Today's companies and entities employ multiple disparate computing systems in various enterprise and inter-enterprise organizations, where certain computing systems perform different parts of an overall business function. As an example, a scenario such as processing an incoming order may involve the participation of a customer relationship management (CRM) system, an enterprise resource management (ERM) system, a supply chain management (SCM) system, and one or more financial management (FM) systems, as well as others. The integration of the systems to perform one or more processes is referred to as process integration. In some instances, a set of systems used to perform specific functionality and operations may be defined to represent a specific process integration (PI) domain.

To monitor the various systems included in a PI domain, runtime components (or "PI components") may run on, along with, or in combination with the systems to capture technical information about the overall operations of the PI domain, as well as to determine the process and success of messages and events occurring on or in connection with those PI components. Each PI component can collect a set of information associated with the messages and events that occur on the PI component's associated system.

SUMMARY

The present disclosure involves systems, software, and computer implemented methods for centralized message searching of business processes. One process includes identifying a process integration (PI) domain associated with a message search, where the PI domain includes at least one PI component, and receiving a set of user-defined search attributes for searching messages within the identified PI domain, where each search attribute associated with a corresponding value. At least one message corresponding to the set of the received user-defined search attributes associated with at least one PI component is identified, and information associated with the identified at least one message corresponding to at least a portion of the set of received search attributes is retrieved. At least a portion of the retrieved information associated with the identified at least one message is presented via a user interface.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 6A-E are example screenshots of various dashboards and interactions provided through use of an appropriate system, such as the system described in FIG. 1A.

FIGS. 11A-E are example screenshots of various dashboards and interactions provided through use of an appropriate system, such as the system described in FIG. 1A.

DETAILED DESCRIPTION

Figure 1A:
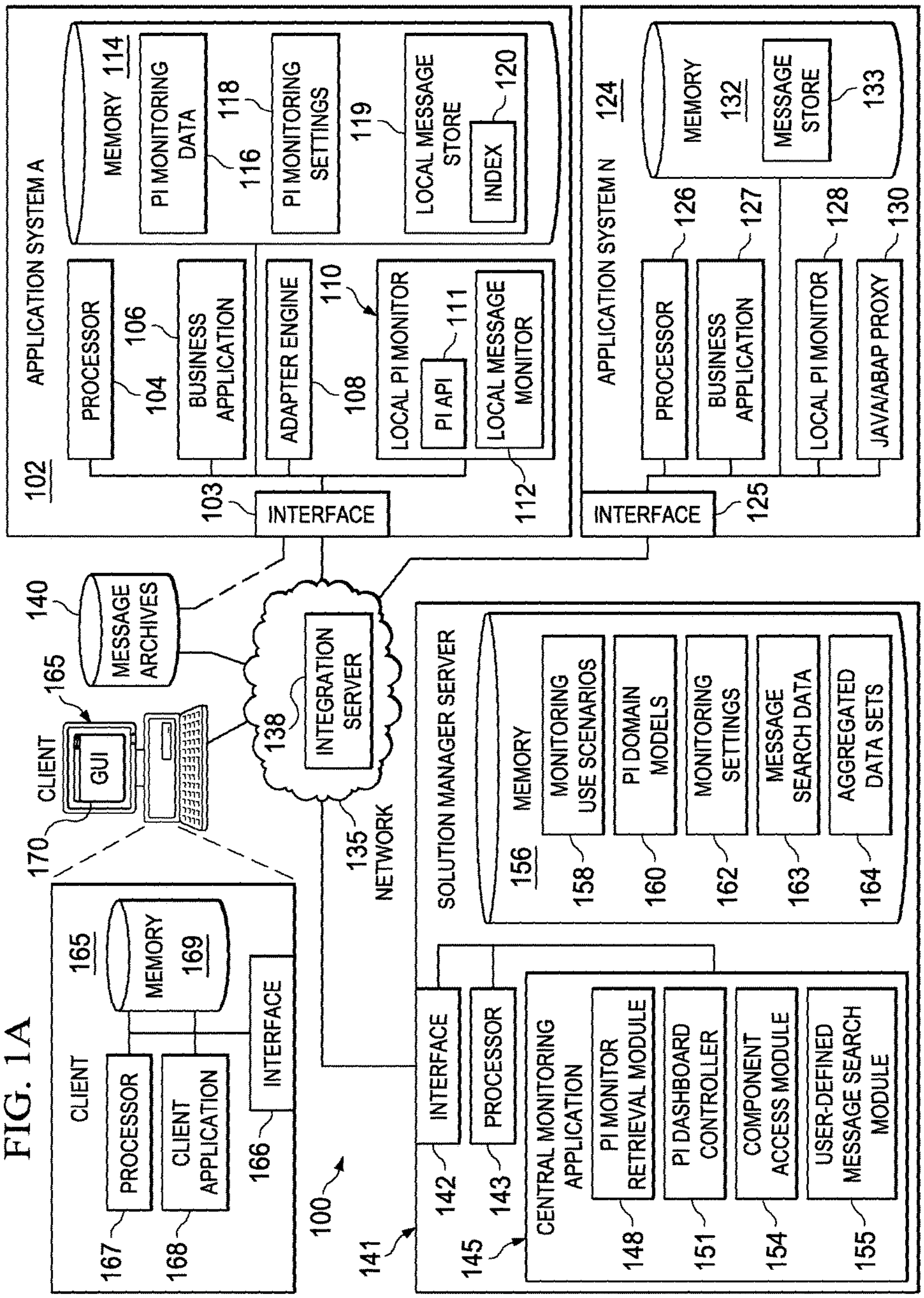
FIGS. 1A and 1B illustrates an example environment for centrally monitoring a distributed business process using various process integration (PI) components.

This disclosure generally describes computer systems, software, and computer implemented methods for providing centralized process integration (PI) domain message monitoring and message searching in distributed systems involved in message processing. Previously, PI monitoring operations were performed on a PI component-by-component basis, requiring users to access each PI component in a distributed system to review monitoring and other status information collected during the operation of those components, as well as to search for particular messages or sets of messages matching one or more search criteria. In other words, previous systems provided local monitoring applications for different components, but failed to provide a centralized monitoring and message searching system allowing users, technical analysts, and system administrators to be provided an overall view and status of complex systems. Some systems may have as many as hundreds of PI components collecting information through various local monitoring applications, making system-wide monitoring and message searching processes of system administrators difficult.

The present disclosure describes a system where centrally orchestrated calls to PI components associated with a particular PI domain are used to retrieve information on processed messages and events previously monitored at the various PI components. In some instances, a central monitoring application can access the information through one or more application programming interfaces (APIs) associated with the various PI components. The information collected by the central monitoring application may include some, all, or none of the following details: (1) message and event metadata (e.g., message header data) such as the integration scenario a particular message or event is associated with, the technical channels through which a message was sent, etc.; (2) statistics associated with one or more monitored messages; and (3) status information on the relative success or failure of particular monitored messages. Additional information may be collected in some implementations, including some or all of the content included in or associated with particular messages or events. The data, once collected, can be stored at the central system (or made accessible thereto) and aggregated for reporting and monitoring purposes. For the message searching functionality, a central tool for accessing the various PI components and their corresponding stored messages is provided. Using the central monitoring application, one or more PI domains can be selected for a particular search, and a set of search criteria can be defined. Upon initiating the search, the central monitoring application can call or connect to the PI components associated with the identified PI domains to perform the message search from a central location.

In some implementations, aggregation and association of particular messages and events by the central monitoring application may be based, not on a message globally unique identifier (GUID) basis, but instead, on certain metadata attributes associated with the collected messages. By aggregating/correlating messages based on the metadata (usually generated by the local monitoring applications), each individual message does not need to be read, thereby saving valuable systems resources, memory load, and storage. Further, the content of particular messages becomes less important, allowing technical users to take a macro-level view of the PI domain and its associated operations to identify and address system-wide issues unrelated to the particular content within individual messages.

To address the issues, algorithms determining the success, temporary success, or failure of particular messages and events sent or existing within the PI domain and among various PI components are used. In some instances, a message may be considered successful from the aspect of a first PI component, in the fact that it was successfully sent by the first PI component's associated system, while as a whole, the message was a failure, as a later system monitored by a second PI component failed to process or forward the message at a later time. After correlating the two (or more) messages, an end-to-end status of a particular message path can be determined by reviewing the combined path of related messages in the overall sense of the PI domain. In one example, messages may be correlated using aggregated message headed information collected from multiple PI runtime components, with information derived as to how many related messages were received or identified and through which path of PI runtime components the messages passed. In some instances, a message or event may be considered processed "temporarily successfully" until that message has reached its intended destination and/or left the PI domain. Once the message has reached its intended destination and/or left the PI domain being monitored, the message may be considered as having been processed "successfully." Additionally, if the message failed during processing, did not reach its destination in an allotted period of time, or otherwise was known to fail, the message can be considered as having been processed "unsuccessfully."

Information on the relative success or failure of certain messages can be presented to technical users through a dashboard presenting summary information on the status of one or more PI domains and their associated PI components. Further, users can be provided additional details as to specific message types, interactions, and other information included in or derived from the collected sets of information. The presented information can be used to locate specific areas of concern, including information on messages, PI components, and other portions of the PI domain and related systems in which errors, warnings, exceptions, and other issues have occurred. Once those areas are located, the dashboard can provide functionality allowing users to attempt to resend (or initiate) a failed message, such as to test whether an error associated with the message and its message path components continues. The dashboard may also allow technical users to generate one or more helpdesk tickets based on observed issues occurring within the system, allowing the person(s) or organization(s) associated with observed issues to be notified and address the issues as soon as possible. In other words, the collected information and the generated dashboard allow users to view the statistics and information associated with particular PI domains in a single location, as opposed to requiring users to access each PI component individually. Additionally, the described dashboard can provide an export functionality that, for example, can be used to report upon processed message volume for a given time period (i.e., Last Month, Last Week, etc.), which can provide detailed information and reports on the messages. The export functionality can generate form and customized reports for use in analyzing the associated systems, providing users and administrators with detailed information on the status of multiple PI domains and their systems.

A corresponding dashboard can also be provided to technical users for searching messages stored at each PI component (or in a PI component-associated archive). In some instances, the message search dashboard may be incorporated within a portion of a larger, central monitoring dashboard, providing additional search capability for locating and, if the searching user is properly authorized, viewing payload information associated with and included within the message. The search functionality enables the central monitoring application to access and present the messages stored locally at the particular system associated with one or more PI components included within a particular PI domain.

Turning to the illustrated example, FIG. 1A illustrates an example environment 100 for centrally monitoring a distributed business process using various process integration (PI) components. The illustrated environment 100 includes, or is communicably coupled with, one or more application systems 102, 124, a solution manager server 141, an integration server 138, one or more clients 165, and a message archive system 140. At least some of the components can communicate across or via network 135. In general, environment 100 depicts an example configuration of a system capable of collecting, at the solution manager server 141, information associated with messages and events occurring at a plurality of application systems 102, 124, including the messages sent between those systems 102, 124. Additionally, each application system 102, 124 can also locally collect and store at least a portion of the messages (including their payload data and contents) received and/or sent by corresponding business application 106. Without the described solution, users must be present at or logged into the individual application systems 102, 124 to access the stored messages. The present solution may allow the central monitoring application 145 to access and search these local message stores 119 via a central location and interface, removing the need for users and administrators to manually access the respective application systems 102, 124 and their respective local message stores 119, 113.

The application systems 102, 124 may each represent a single system within a distributed business process, where each system performs a particular task associated with the business process. For example, application system A 102 and application system N 124 may each comprise a portion of a CRM system for receiving and processing customer orders. In other instances, application system A 102 may be part of a CRM system, while application system N 124 may be a part of an ERP system performing tasks related to or associated with the CRM system. Based on their relationship, the two application systems 102, 124 may be defined as two parts of the same PI domain. Still further, in some instances, the application systems 102, 124 may represent different portions of the same physical system virtually distinguished or separated based on the functionality and/or operations they perform. While only two application systems are illustrated, other implementations may include only one or more than two application systems. In alternative implementations, some or all of the illustrated elements may be included in or associated with different and/or additional systems/servers, clients, networks, or locations other than those illustrated in FIG. 1A. For example, the components illustrated within the solution manager server 141 may be included in multiple servers, parts of one or more cloud-based networks, or other locations accessible to the solution manager server 141 (e.g., either directly or via network 135).

In general, the solution manager server 141 is any server or system that stores and executes a central monitoring application 145 used to monitor one or more application systems (e.g., 102, 124) associated with or included in one or more PI domain models (or definitions) 160 and/or monitoring use scenarios 158. For example, the solution manager server 141 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the solution manager server 141 may store a plurality of various other applications, while in other instances, the solution manager server 141 may be a dedicated server specifically meant to store and execute the central monitoring application 145 and its related functionality. In some implementations, the solution manager server 141 may also provide other monitoring and system administration tools. In some instances, the solution manager server 141 may comprise a web server or be communicably coupled with a web server, where the central monitoring application 145 represents a web-based (or web-accessible) application accessed and executed on one or more of the associated clients 165 to perform the programmed tasks or operations of the central monitoring application 145.

At a high level, the solution manager server 141 comprises an electronic computing device operable to receive, transmit, process, store, or manage data and information associated with the environment 100. The solution manager server 141 illustrated in FIG. 1A can be responsible for receiving requests from one or more clients 165 (as well as any other entity or system interacting with the central monitoring application 145), responding to the received requests by processing said requests through the inherent functionality and components of the central monitoring application 145, and sending the appropriate responses from the central monitoring application 145 (including a generated or updated dashboard visualization) back to the requesting client 165 or other system. The central monitoring application 145 can also process and respond to local requests from a user locally accessing the solution manager server 141. In some instances, the central monitoring application 145 can actively access one or more local PI monitors 111 associated with one or more application systems to perform one or more functions related to message searching. Accordingly, in addition to requests from the clients 165 illustrated in FIG. 1A, requests may also be sent from internal users, external or third-party customers, and other applications, as well as any other appropriate entities, individuals, systems, or computers. In some instances, the central monitoring application 145 may be a web-based application executing monitoring functionality associated with a networked or cloud-based distributed business process.

As used in the present disclosure, the term "computer" is intended to encompass any suitable processing device. For example, although FIG. 1A illustrates a single solution manager server 141, environment 100 can be implemented using any number of servers, as well as computers other than servers, including a server pool. Indeed, the solution manager server 141 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated solution manager server 141 may be adapted to execute any operating system, including Linux, UNIX, Windows, Mac OS, or any other suitable operating system. According to one implementation, the solution manager server 141 may also include or be communicably coupled with a mail server.

In the illustrated implementation of FIG. 1A, the solution manager server 141 includes an interface 142, a processor 143, a memory 156, and a central monitoring application 145. The interface 142 is used by the solution manager server 141 to communicate with other systems in a client-server or other distributed system environment (including within environment 100) connected to the network 135 (e.g., an associated client 165, as well as other systems communicably coupled to the network 135). FIG. 1A depicts both a server-client environment, but could also represent a cloud computing network. The interface 142 generally comprises logic encoded in software and/or hardware in a suitable combination and operable to communicate with the network 135. More specifically, the interface 142 may comprise software supporting one or more communication protocols associated with communications such that the network 135 or the interface's hardware is operable to communicate physical signals within and outside of the illustrated environment 100.

Generally, the solution manager server 141 may be communicably coupled with a network 135 that facilitates wireless or wireline communications between the components of the environment 100 (i.e., between the solution manager server 141 and one or more of the clients 165, or between different application systems 102, 124), as well as with any other local or remote computer, such as additional clients, servers, or other devices communicably coupled to network 135, including those not illustrated in FIG. 1A. In the illustrated environment, the network 135 is depicted as a single network, but may be comprised of more than one network without departing from the scope of this disclosure, so long as at least a portion of the network 135 may facilitate communications between senders and recipients. In some instances, one or more of the components associated with the solution manager server 141 may be included within the network 135 as one or more cloud-based services or operations. For example, the integration server 138 is illustrated as within the network 135, and may be operated at least partially within a cloud-based system in network 135. The network 135 may be all or a portion of an enterprise or secured network, while in another instance, at least a portion of the network 135 may represent a connection to the Internet. In some instances, a portion of the network 135 may be a virtual private network (VPN). Further, all or a portion of the network 135 can comprise either a wireline or wireless link. Example wireless links may include 802.11a/b/g/n, 802.20, WiMax, and/or any other appropriate wireless link. In other words, the network 135 encompasses any internal or external network, networks, sub-network, or combination thereof operable to facilitate communications between various computing components inside and outside the illustrated environment 100. The network 135 may communicate, for example, Internet Protocol (IP) packets, Frame Relay frames, Asynchronous Transfer Mode (ATM) cells, voice, video, data, and other suitable information between network addresses. The network 135 may also include one or more local area networks (LANs), radio access networks (RANs), metropolitan area networks (MANs), wide area networks (WANs), all or a portion of the Internet, and/or any other communication system or systems at one or more locations. The network 135, however, is not a required component in all implementations of the present disclosure.

As illustrated in FIG. 1A, the solution manager server 141 includes a processor 143. Although illustrated as a single processor 143 in the solution manager server 141, two or more processors may be used in the solution manager server 141 according to particular needs, desires, or particular embodiments of environment 100. The processor 143 may be a central processing unit (CPU), a blade, an application specific integrated circuit (ASIC), a field-programmable gate array (FPGA), or another suitable component. Generally, the processor 143 executes instructions and manipulates data to perform the operations of the solution manager server 141 and, specifically, the functionality associated with the corresponding central monitoring application 145. In one implementation, the server's processor 143 executes the functionality required to receive and respond to requests and instructions from the one or more clients 165 using the central monitoring application 145, as well as the operations used to access processed message information from the one or more application systems 102, 124.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1A are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, the processor 143 executes the central monitoring application 145 (and its associated functionality) on the solution manager server 141. In some instances, a particular solution manager server 141 may be associated with the execution of two or more central monitoring applications 145, as well as two or more instances of a single central monitoring application 145, as appropriate.

At a high level, the central monitoring application 145 is any application, program, module, process, or other software that may execute, change, monitor, and manage information associated with one or more application systems 102, 124, and those system's associated PI components. In some instances, portions of the central monitoring application 145 may operate in response to and in connection with one or more requests received from a client 165 via network 135. Additionally, the central monitoring application 145 may operate independently based on a set of monitoring use scenarios 158, one or more defined PI domain models 160, a set of monitoring settings 162, and a set of message search data 163 directing when and how information is to be collected and/or accessed. In some instances, portions of the central monitoring application 145 may represent a web-based application accessed and executed (at least in part) by one or more external clients 165 or other suitable entities via network 135 (e.g., through the Internet). In general, the central monitoring application 145 may perform three functions, as well as any number of additional and/or related operations. First, the central monitoring application 145 can retrieve sets of messaging and event information from one or more application systems 102, 124 and store those sets of retrieved information in one or more aggregated data sets 164 at the solution manager server 141. By collecting the messaging and event information at a centralized location (or a location accessible to the central monitoring application 145), the central monitoring application 145 can access sets of relevant data and other information without needing to access or poll each message received or processed at a single application system individually, thus saving time and resources on the production systems or machines. Instead, statistics on various messages within particular message scenarios can be accessed, which can then be correlated to one or more related messages.

Third, the central monitoring application 145 can, in response to requests from technical users, analysts, and other suitable users or individuals, perform centralized message searches for PI domains across a plurality of PI components. Specifically, the central monitoring application 145 can access local message monitors 112 associated with application systems to engage the search capabilities of local PI monitors 110, 128. A particular search submitted through the central monitoring application 145 can specify or determine one or more PI domains to search, the particular PI components within the PI domain to search, and particular user-defined search attributes with which to search the corresponding local message stores and/or indexes. The results of the various local searches satisfying the user-defined search attributes can be returned to the central monitoring application 145 for aggregation, presentation, and analysis.

Third, the central monitoring application 145 can, in response to requests from technical users, analysts, and other suitable and/or authorized users, generate and present the aggregated data sets to provide an overview of the statuses associated with various messages and events occurring throughout a system or environment, such as environment 100, as well as the results of a particular centralized message search. In some instances, the central monitoring application 145 (or a related application) can generate, update, and maintain different dashboards and other visualizations presenting the collected information requested. Among other functionality, the central monitoring application 145 may also be used to fix errors identified once the aggregated data sets or results of a particular message search are analyzed or reviewed. For example, the central monitoring application 145 may be used to generate a helpdesk ticket for technical support, or, in some cases, attempt to resend or re-execute one or more messages or events that have experienced errors or have otherwise failed. The central monitoring application 145 may perform other operations to assist in monitoring various systems and the messages and events occurring therein.

While illustrated as internal to the solution manager server 141, one or more processes associated with the central monitoring application 145 may be stored, referenced, or executed remotely. For example, a portion of the central monitoring application 145 may be a web service associated with the central monitoring application 145 that is remotely called, while another portion of the central monitoring application 145 may be an interface object or agent bundled for processing at a remote client 165. Moreover, any or all of the central monitoring application 145 may be a child or sub-module of another software module or enterprise application (not illustrated) without departing from the scope of this disclosure. Still further, portions of the central monitoring application 145 may be executed or accessed by a user working directly at the solution manager server 141, as well as remotely at a corresponding client 165. The central monitoring application 145 is illustrated as including a PI monitor retrieval module 148, a PI dashboard controller 151, a component access module 154, and a user-defined message search module 155. All, some, none, or different modules may be included in different implementations of the central monitoring application 145. Additionally, some or all of the modules may be combined with each other, as well as integrated into the functionality provided by another component.

The PI monitor retrieval module 148 accesses the local logs and monitoring information of the PI monitoring data 116 stored at individual application systems (i.e., 102, 124) and retrieves that information for storage at one or more centralized locations. In some instances, the retrieved information may be stored as part of the aggregated data sets 164. The PI monitor retrieval module 148 can access the information stored on the application systems through APIs defined and exposed at the individual systems, such as the PI API 111 illustrated within a local PI monitor located on application system A 102 or one or more APIs exposed by the adapter engine 108, also located on the application system A 102. Alternative and/or additional methods of retrieving the information from the different application systems may also be used. In some instances, information may be sent from the application systems to the central monitoring application 145. The application systems associated with a particular PI monitor retrieval module 148, as well as the frequency and type of information retrieved, may be determined based on one or more parameters defined at the solution manager server 141.

As previously described, the aggregated data sets 164 that include information retrieved from the various application systems is located in memory 156 of the solution manager server 141. Memory 156 is used for storing data and program instructions associated with the solution manager server 141 and, more specifically, the central monitoring application 145. The memory 156 may include any memory or database module and may take the form of volatile or non-volatile memory including, without limitation, magnetic media, optical media, random access memory (RAM), read-only memory (ROM), removable media, or any other suitable local or remote memory component. The memory 156 may store various objects or data, including classes, frameworks, applications, backup data, business objects, jobs, web pages, web page templates, database tables, process contexts, and any other appropriate information including any parameters, variables, algorithms, instructions, rules, constraints, or references thereto associated with the purposes of the solution manager server 145 and its central monitoring application 145. In some implementations, including cloud-based systems, some or all of the memory 156 may be stored remote from, but communicably coupled to, the solution manager server 141. As illustrated, memory 156 includes one or more monitoring use scenarios 158, one or more PI domain model definitions 160, one or more monitoring settings 162, and, as previously described, one or more aggregated data sets 164.

The set of PI domain model definitions 160 describes or defines one or more PI components that are included in one or more PI domains. Each PI domain can be defined to include a set of PI components associated with one or more business components performing a particular task or set of tasks. The PI components included in a particular PI domain may be automatically associated with one another in some instances, or manually assigned in others. In some instances, the PI components in different PI domains may overlap, such that some PI components are included in different PI domains. Examples may include PI domains associated with related business processes where some of the PI components may be used in both situations (i.e., creating a purchase order and fulfilling a purchase order). A set of PI components is logically grouped into a PI domain based on the processes and operations being monitored. The PI components making up a particular PI domain can include various runtime components that monitor and capture message and event information during execution of a system and its business processes. Some PI components may be involved in message processing, while other PI components may be involved in other processing. Each PI component is executing or running on a technical system, such as a system executing ABAP-based programs and tools or a system executing Java-based programs and tools, including the application systems 102, 124 illustrated in FIG. 1A. In some instances, more than one PI component may be running on a single technical system. Examples of PI components include adapter engines (e.g., adapter engine 108 of application system A 102) and proxies (i.e., Java/ABAP proxy 130), although other components can also be used as PI components.

Returning to FIG. 1A, the set of PI domain model definitions 160 can provide the central monitoring application 145 with information on what PI domains exist in an environment, as well as the PI components (and their associated application systems or components) that make up the PI domain. The central monitoring application 145 can determine from a particular PI domain model 160 the PI components to be accessed for information regarding a particular PI domain 160. As an example, one PI domain associated with environment 100 may include the two illustrated application systems 102, 124. The set of monitoring use scenarios 158 may be used to determine the type of information to be retrieved from the PI components associated with a particular PI domain. Alternatively, the set of monitoring use scenarios 158 may be used to determine the type of information that is relevant in a particular use case. In some monitoring use scenarios, a portion of the metadata stored at some PI components may not be necessary, and therefore may not be collected by the PI monitor retrieval module 148. In some instances, administrators and other users may specify that a particular monitoring use scenario 158 is to be associated with a particular PI domain 160. That association can be read by the PI monitor retrieval module 148 to determine the information to be accessed and collected in a particular monitoring situation. The monitoring use scenario 158 associated with a particular PI domain 160 can be changed at different intervals or in response to particular events or other triggers, including a threshold number of errors identified for messages, wherein a more detailed monitoring use scenario 158 may be applied. In some instances, the monitoring use scenario 158 may be manually selected, while in others, a default or dynamically determined monitoring use scenario 158 can be applied to a particular PI domain 160. The monitoring settings 162 may also be associated with different PI domains 160, as well as individual PI components. The monitoring settings 162 can be used to determine the frequency of information and data collection performed by the central monitoring application 145, and may provide different collection frequencies on a per PI domain basis, as well as on a per PI component basis. The specific parameters defined by the monitoring settings 162 can be defined manually, provided a default value, or dynamically determined based on information associated with or related to the different technical systems (i.e., the application systems 102, 124) and/or the monitoring use scenario 158.

The central monitoring application 145 is also illustrated as including a PI dashboard controller 151. The PI dashboard controller 151 uses the collected data to generate and provide one or more dashboards presenting the human-readable results to technical users, administrators, and other entities. The generated dashboards can be used to display information regarding different subsets of information included within the aggregated data sets 164 stored in memory 156. In some instances, the information included in the generated dashboards can initially begin at a high-level of data, providing general information on the types of messages and events occurring in a particular domain. Still further, the initial step in using the generated dashboards may be determining a particular PI domain (where multiple PI domains are monitored) for which to view relevant data. Once a particular PI domain is selected, relevant information associated with that PI domain can be displayed in the generated dashboard. The PI dashboard controller 151 can provide tools in the generated display to allow technical users to define one or more filters on the data to be presented, as well as allowing users to focus on different aggregated data sets or analyses performed on the different aggregated data sets. The PI dashboard controller 151 can interpret the filter request and generate the appropriate dashboard in response to the filter selection. The types of dashboard views available may include at least one of the following: an overall PI domain listing defining the PI domains for which monitoring information is available (see FIG. 6A), an overview monitor for a specific PI domain showing the issues and general information regarding the specific PI domain (see FIG. 6B), a message error monitor displaying the messaging errors and related information for a particular PI domain (see FIG. 6C), a message backlog monitor providing information on prior successful and unsuccessful messages sent through a PI domain (see FIG. 6D), and a message flow monitor providing information on different messages sent between various components within the PI domain (see FIG. 6E), among others. In general, the PI dashboard controller 151 can generate, maintain, and manipulate one or more dashboards associated with the information collected by the central monitoring application 145, usually in response to specific user requests and interactions.

The central monitoring application 145 is further illustrated as including a component access module 154. The component access module 154 is used to access various exposed APIs associated with different systems within a PI domain (and associated with one or more PI components) in order to interact with the systems in the PI domain. For example, the component access module 154 can take input received via a presented dashboard and, in response, request that a particular message or event presented for which information is presented within the dashboard be re-initiated or cancelled. This interaction with the various technical systems (i.e., the application systems 102, 124) may be available because the solution manager server 141 and its components are provided information for each of the technical systems associated with a particular PI component. During a setup procedure, connections may be established between the central monitoring application 145 (and specifically, the component access module 154) and the technical systems to allow the central monitoring application 145 to perform certain actions on the technical systems. In some instances, remote function call (RFC) destinations for one or more applications on the remote technical system may be identified and stored on the solution manager server 141. When a particular action associated with a technical system is identified in the dashboard, the component access module 154 can identify the connection associated with the technical system and use that connection, through exposed APIs, for example, to pass the values and information necessary to execute the requested action. The component access module 154 is the component of the central monitoring application 145 that performs the calls to these APIs and that controls the actions and events in response to input received through a presented dashboard and interpreted by the PI dashboard controller 151.

The central monitoring application 145 also includes a user-defined message search module 155. The user-defined message search module 155 provides the central monitoring application 145 with the ability to initiate a PI domain-wide message search in one or more of the application systems 102, 124 included within particular PI domains. In some instances, the user-defined message search module 155 can operate in concert with the component access module 154 to access local message monitors 112 or related message search functionality executing locally at each application system 102, 124. The user-defined message search module 155 can receive particular search criteria for a message search via a user interface associated with the central monitoring application 145, where the search criteria or attributes define or identify a PI domain associated with a search, at least a subset of the PI components within that PI domain, and particular criteria that a message result set is to satisfy. In some instances, the user-defined message search module 155 can identity information associated with a particular search from either the PI domain models 160 or a stored set of message search data 163. The PI domain models 160 are described in further detail below, and provide a model or other description of the applications systems and PI components included in a particular PI domain 160. In some instances, the message search data 163 may identify, define, or provide information associated with one or more APIs (e.g., PI API 111) used to access local message search monitors 112 and their corresponding local message stores 119, 133, as well as message archives 140 that may be, in some instances, remote from a particular application system 102, 124. The user-defined message search module 155 can access the functionality of the various local message monitors 112 included within or associated with the various local PI monitors 110, 128.

In some instances, instead of performing the message search itself, the user-defined message search module 155 can instead remotely initiate the local message monitors 112 to perform the message searches themselves and then returning the search results back to the user-defined message search module 155. The search results, in contrast to the aggregated data sets 164, may contain actual payload data included in messages returned with the search results. The PI dashboard controller 151 may work with the user-defined message search module 155 to receive the search attributes, initiate execution of the search, and present the corresponding search results and analysis. In some instances, the user-defined message search module 155 can determine, based on the corresponding authorization of the user (e.g., based on the user's role, clearance, or other authorization information) or other privacy or authorization settings associated with the search, the particular message payload data that can be presented to the user. For example, a technical analyst searching for messages related to a human resources (HR) system may not have authorization to view social security numbers, salary information, and other payload data associated with and included in one or more returned messages. In those instances, the user-defined message search module 155 may limit the types of payload data displayed depending on the corresponding authorization or privacy settings associated with a particular search.

The user-defined message search module 155 may use information included in a set of message search data 163 to identify, locate, or communicate with the application systems associated with a particular search. For example, the set of message search data 163 may define the communication locations, APIs, and/or requirements associated with various application systems and/or local PI monitors 11, 128. The user-defined search module 155, after a search is received, can access the communication information for the particular systems to be included in the search. In some instances, the message search data 163 may also store one or more predefined search criteria, allowing for quick access to common searches and search locations. Additionally, the list of messages returned to the user-defined message search module 155 may contain dynamic columns with attributes corresponding to those attributes which have been used in the current and/or previous searches. This can provide immediate feedback as to how a particular search result satisfies the user-defined search attributes.

As described, the central monitoring application 145 of the solution manager server 141 collects information from different application systems 102, 124 included in different, defined PI domains 160. The application systems 102, 124 themselves may be any system or server involved in executing one or more business processes via one or more business applications 106, 127. Similar to the solution manager server 141, the applications systems 102, 124 may be J2EE-compliant application servers that include various Java technologies. In some instances, the application systems 102, 124 may include and execute two or more business applications, while in other instances, the application systems 102, 124 may execute a single, dedicated business application. Each of the application systems 102, 124 may be comprised, at least in part, of a web server, where the business applications 106, 127 (or portions thereof) represent web-based applications or processes that can be executed on a remote client 165. Each application system 102, 124 may be systems for executing different processes associated with one or more business processes, and further, the different application systems may be related to each other in that the business applications 106, 127 may be used together to complete different end-to-end business processes or events. Each application system 102, 124 may be operable by a user local to the systems, as well as through one or more clients 165 communicably coupled to the systems via the network 135. Each application system 102, 124 may represent different hardware configurations, as well as a single server or system using virtualized systems such that application system 102 and application system 124 are co-located on a single server or overall system.

As illustrated, each application system 102, 124 includes an interface 103, 125, a processor 104, 126, the business applications 106, 127, a local PI monitor 110, 128 (sometimes including a PI API 111), and a memory 114, 132. The interfaces, processors, and memories may be similar to or different than those described in the solution manager server 141 (i.e., interface 142, processor 143, and memory 156). The local PI monitors 110, 128 illustrated on the application systems 102, 124 may be components used to perform local monitoring operations in association with the operations on each application system 102, 124. In some instances, the local PI monitors 110, 128 may be legacy monitoring components previously used to collect relevant monitoring information associated with the messages and events of the business applications 106, 127 and/or the application systems 102, 124 as a whole. As illustrated, the local PI monitors 110, 128 can include a local message search module 112, 128, which provide search functionality associated with the local application system. The local message search modules 112, 128 can be used by local users of the respective system. The aggregate functionality of these modules and their respective functionality can be used by the user-defined message search module 155 to perform a PI domain-wide message search. In some instances, the PI APIs 111 can be used by the user-defined message search module 155 to access the local message search modules 112 of the corresponding local PI monitors 110. The information collected by the local PI monitors 110, 128 may include any information relevant to the events or messages performed, received, sent, or executed at each application system 102, 124. The relevant information can be stored by the local PI monitors into the corresponding memory 114, 132 (i.e., in the set of PI monitoring data 116 included in memory 114 of application system A 102, or the illustrated local message stores 119, 133). Local PI monitoring settings 118 may determine or define the type and sets of information to be monitored by the local PI monitor 110, 128. Although not illustrated in application system N 124, application system N 124 may include the same or similar information and data sets as those illustrated in application system A 102. As illustrated, the local PI monitor 110 of application system A 102 may include a PI API 111 exposing various methods for accessing the monitored information associated with the system 102. In some instances, the PI monitor retrieval module 148 may use these APIs 111 to access the information stored with the set of PI monitoring data 116. Alternatively, the PI monitor retrieval module 148 may directly access the sets of PI monitoring data 116 without using the APIs, in some instances.

As illustrated, the respective memories 114, 132 can also include a local message store 119, 133. The local message stores 119, 133 store information associated with each message received at and/or sent by the respective application system 102, 124, including at least a portion of the payload data for at least some of the messages. The local message stores 119, 133 may comprise a single location or a plurality of locations within a particular application system. The local PI monitor 110 and its local message search module 112 can access the appropriate locations of the local message stores 119, 133 to perform the appropriate search functionality. The local message stores 119, 133 can include an index 120 associated with their respective contents, providing quicker and more efficient searches and search capabilities. In some instances, one or more remote message archives 140 may be associated with particular application systems 102, 124, allowing messages to be archived to reduce the size of a particular local message store 119. The message archives 140 can be any suitable storage, and may be included in a cloud-based network location for additional storage and access efficiency. Each application system 102, 124 can define its own specific archive settings based on any suitable factors. The local PI monitors 111, 128 can be made aware of the location of archived messages, and can access the archived messages as appropriate via the local message search module 112. Alternatively, the user-defined message search module 155 can access the message archive 140 to locate and retrieve message payload data associated with archived messages. In some instances, user-defined message searches may be defined to search archived messages, a current set of messages stored within the respective local message stores 119, or a combination of both.

Application system A 102 is illustrated as including an adapter engine 108. The adapter engine 108 may be considered a PI component associated with a particular PI domain. The adapter engine 108 may be a separate software component used by a particular system 102 to communicate and exchange information with one or more other systems, such as application system N 124 and/or the integration server 138. The adapter engine 108 can be used to translate incoming messages received at and outgoing messages sent from the application system A 102 to one or more other systems. In some instances, the adapter engine 108 may be used to translate messages and events sent to and received from the integration server 138, where the integration server 138 controls or manages the sending of messages within the system (and a particular PI domain). Using the adapter engine 108 in combination with the execution of the business application 106, information relevant to a distributed process including messages sent between different systems can be monitored. In some instances, the local PI monitor 110 can be associated with the adapter engine 108 to identify and monitor incoming and outgoing messages as appropriate, storing the relevant information in the set of PI monitoring data 116.

Application system N 124 is illustrated as including a Java or ABAP proxy 130. Similar to the adapter engine 108 described above, the proxy 130 allows for messages to be sent and received by the application system N 124 through an message protocol or language readable by the application system N 124 and its business application 127, as well as for other applications and systems in a particular environment. In general, the proxy 130 can be used to encapsulate the creation or parsing of XML messages and the communication with the relevant runtime components required to send or receive messages. The proxy 130 allows systems to exchange messages with different communication parties, as well as through the use of the adapter engine 108 and the integration server 138.

Figure 1B:
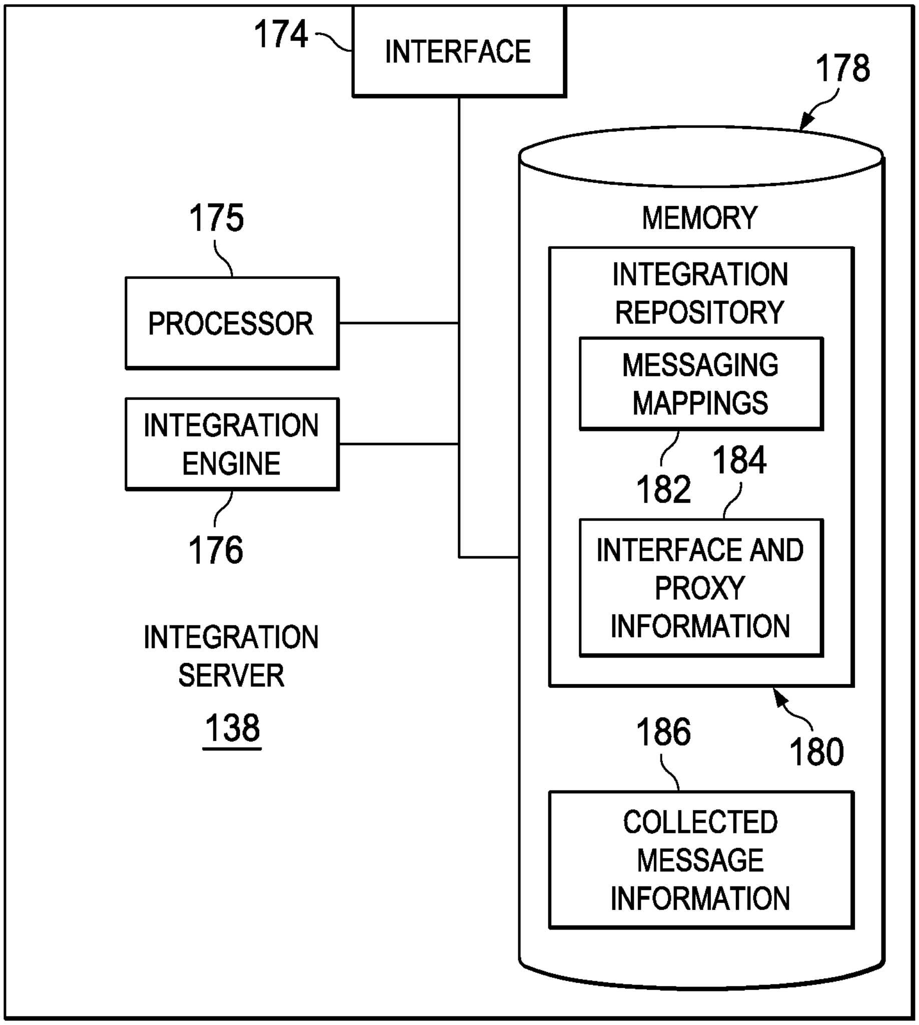

The integration server 138 is a runtime system for receiving, processing, and forwarding messages between different systems within an environment, such as environment 100. In some instances, all messages sent between the different systems 102, 124 may be sent via the integration server 138, while in other instances, some or all of the messages may be sent directly between the different systems 102, 124 without using the integration server 138. As illustrated in FIG. 1B, the integration server 138 includes interface 174, processor 175, memory 178, and an integration engine 176. The interface 174, processor 175, and memory 178 may be similar to or different than those described for the solution manager server 141, with the components associated with the operations of the integration engine 176. In general, the integration server 138 may facilitate interaction between diverse operating systems and application systems across internal and external networks (e.g., 135). In some instances, messages between different application systems 102, 124 can be sent to the integration server 138 first, where the integration engine 176 interprets the messages, determines the corresponding receiver of the message, and forwards or relays the message to the corresponding receiver system. Information on the messages sent via the integration server 138 can be stored in the set of collected message information 186. The information can be viewed locally on the integration server 138, or collected by the PI monitor retrieval module 148 and included in the aggregated data sets 164 for processing, display, and analysis. Memory 178 stores information used by the integration engine 176 to perform its operations, including the information in the integration repository 180. The integration repository 180 includes information defining integration scenarios, integration processes, interfaces and proxy information 184, and messaging mappings 182 between different components in the system. The interfaces and proxy information 184 may be used to create interfaces, adapters, and proxies within the environment 100, as well as to determine the appropriate messaging schema and format for exchanging messages between systems. The messaging mappings 182 may define the paths different types of messages may take between components, allowing the integration engine 176 to analyze a particular message and determine the appropriate receiver system, using the interface and proxy information 184 to modify the particular message into the appropriate format where needed. The integration engine 176, or a monitoring component (not illustrated), can extract and store information associated with the received, sent, and forwarded messages and events occurring at or performed by the integration server 138 to the set of collected message information 186.

As illustrated in FIG. 1A, the integration server 138 may be located in a cloud-based system within network 135. Alternatively, the integration server 138 may be a component within an on-premise or other conventional system, as well.

Returning to FIG. 1A, the illustrated environment includes one or more clients 165. The clients 165 may be associated with a particular application system 102, 124, or the solution manager server 141 and its central monitoring application 145. Each client 165 may be any computing device operable to connect to or communicate with at least one of the application systems 102, 124 or solution manager server 141 using a wireline or wireless connection, via the network 135, or another suitable communication means or channel. In some instances, the client 165 may be a part of or associated with a business process involving one or more of the application systems, while in other instances, the client 165 may be associated with an administrator or monitoring account used in association with the central monitoring application 145. In general, each client 165 includes a processor 167, an interface 166, a client application 168, a graphical user interface (GUI) 170, and a memory 169. In general, client 165 comprises an electronic computer device operable to receive, transmit, process, and store any appropriate data associated with the environment 100 of FIG. 1A. It will be understood that there may be any number of clients 165 associated with, or external to, environment 100. For example, while illustrated environment 100 includes a single client 165, alternative implementations of environment 100 may include multiple clients communicably coupled to the one or more of the systems illustrated. In some instances, at least one client 165 may be associated with an administrator of the environment, and may be capable of accessing and interacting with the central monitoring application 145. Additionally, there may also be one or more additional clients 165 external to the illustrated portion of environment 100 capable of interacting with the environment 100 via the network 135. Further, the terms “client” and “user” may be used interchangeably as appropriate without departing from the scope of this disclosure. Moreover, while each client 165 is described in terms of being used by a single user, this disclosure contemplates that many users may use one computer, or that one user may use multiple computers.

The GUI 170 associated with each client 165 may comprise a graphical user interface operable to, for example, allow the user of a client 165 to interface with at least a portion of the central monitoring application 145 and its associated operations and functionality, including the one or more dashboards generated by the PI dashboard controller 151. Generally, the GUI 170 provides the particular user with an efficient and user-friendly presentation of business data provided by or communicated within the system. The GUI 170 may comprise a plurality of customizable frames or views having interactive fields, pull-down lists, and buttons operated by the user. For example, the GUI 170 may provide interactive elements that allow a user to interact with a particular business application 106, 127 or the central monitoring application 145, as well as other components within and/or external to environment 100. The different portions of functionality provided by the central monitoring application 145 may be presented and accessible to the user through the GUI 170, such as through a client application 168 (e.g., a web browser). Generally, the GUI 170 may also provide general interactive elements that allow a user to access and utilize various services and functions of a particular business application 106, 127. In some instances, the client application 168 may be used to access various portions of different application systems, including the PI monitoring data 116 collected on a specific application system 102, 124. In some instances, the client application 168 may be used to access (and the GUI 170 used to view) information retrieved directly from an application system 102, 124. Alternatively, the client application 168 may be used to access and manipulate the central monitoring application 145, including as an administrator capable of modifying the operations and parameters associated with the monitoring of one or more PI domains, as well as modifying the definitions and boundaries of a particular PI domain. In some instances, the client application 168 may be an agent or client-side version of the central monitoring application 145. The GUI 170 may present the information of the client application 168 for viewing and interaction. In general, the GUI 170 is often configurable, supports a combination of tables and graphs (bar, line, pie, status dials, etc.), and is able to build real-time portals, where tabs are delineated by key characteristics (e.g., site or micro-site). Therefore, the GUI 170 contemplates any suitable graphical user interface, such as a combination of a generic web browser, intelligent engine, and command line interface (CLI) that processes information in the platform and efficiently presents the results to the user visually.

As used in this disclosure, each client 165 is intended to encompass a personal computer, touch screen terminal, workstation, network computer, kiosk, wireless data port, smart phone, personal data assistant (PDA), one or more processors within these or other devices, or any other suitable processing device. For example, each client 165 may comprise a computer that includes an input device, such as a keypad, touch screen, mouse, or other device that can accept user information, and an output device that conveys information associated with the operation of one or more application systems 102, 124, those system’s business applications 106, 127, the central monitoring application 145, and/or the client 165 itself, including digital data, visual information, or the GUI. Both the input and output device may include fixed or removable storage media such as a magnetic storage media, CD-ROM, or other suitable media, to both receive input from and provide output to users of client 165 through the display, namely, the GUI 170. The client’s 165 processor 167, interface 166, and memory 169 may be similar to or different from those described in connection with the other components illustrated in FIG. 1A, although alternative implementations of one or more of these components may be used, as well as implementations where additional components may also be included.

Figure 2:
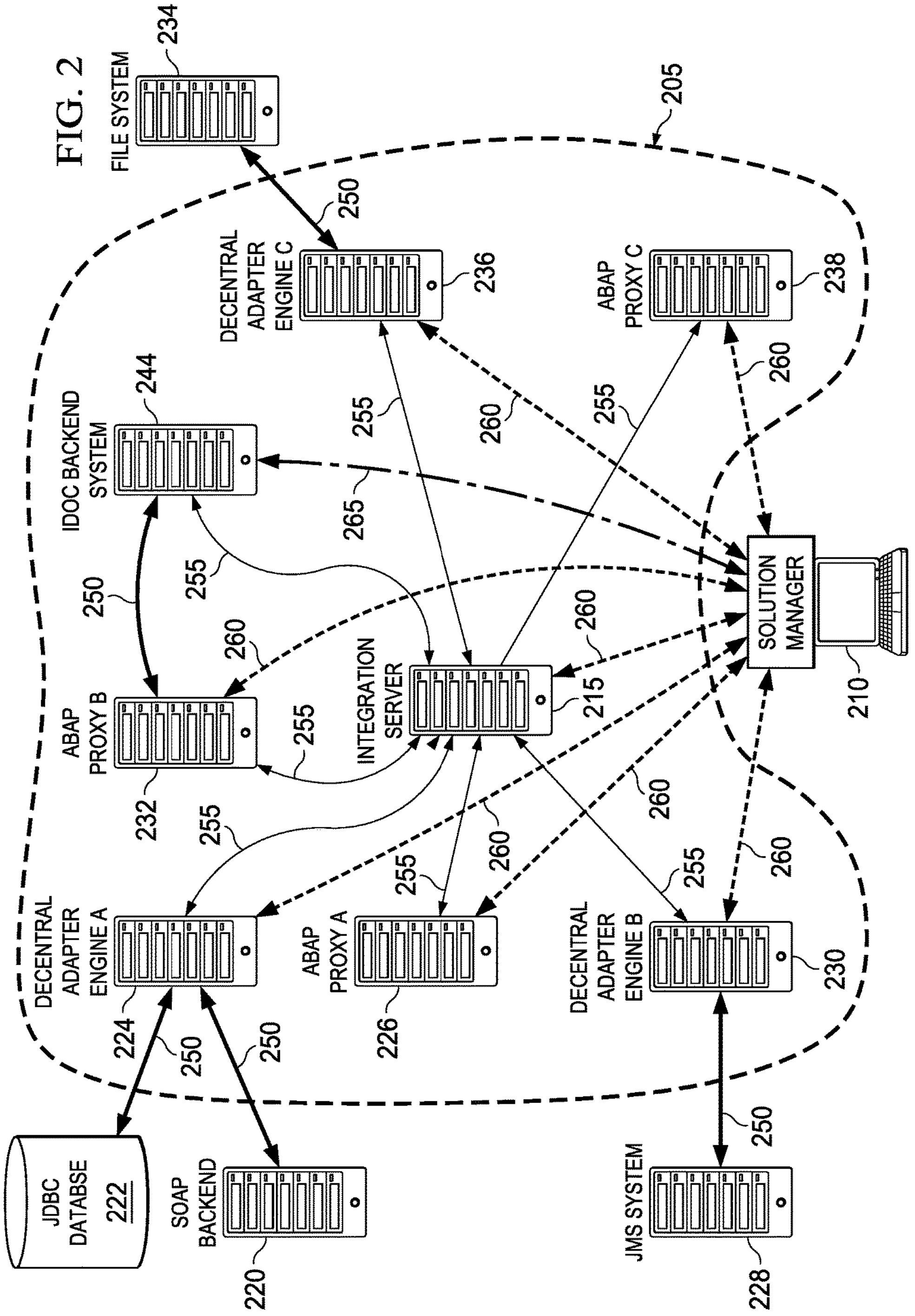
FIG. 2 illustrates a diagram of an example PI domain defined in a distributed system used to centrally monitor a plurality of business process systems.

FIG. 2 illustrates a diagram 200 of an example PI domain 205 defined in a distributed system used to centrally monitor a plurality of business process systems in an end-to-end manner. The PI domain 205 is based on a definition stored at (or referenced by) the central monitoring application located at the solution manager server 210. The PI domain 205 may be defined based on relationships between various systems, and specifically based on the sending of messages between those systems.

In the illustrated example, various systems are illustrated, namely, a SOAP backend server 220, a JDBC database system 222, a JMS system 228, and a file system 234. These systems are each associated with adapter engines—adapter engine A 224 with the SOAP backend server 220 and the JDBC database system 222, adapter engine B 230 associated with the JMS system 228, and adapter engine C 236 associated with the file system 234. The relationships between these components are illustrated by the arrows 255. In some instances, the adapter engines may be located within the system they are associated with, while in others, the adapter engines may be located separately from those systems. For purposes of the illustration in FIG. 2, the adapter engines are illustrated separately from the associated systems for purposes of distinction. Further, the PI domain 205 is considered to include the adapter engines themselves, but not the associated systems. Each of the adapter engines are considered PI components within the PI domain 205 where messages, messaging information, and message metadata is stored and available for access.

The PI domain 205 also includes three ABAP proxies: ABAP proxy A 226, ABAP proxy B 232, and ABAP proxy C 238. In alternative implementations, one or more of the proxies may be Java-based proxies, as appropriate. The proxies may be used in association with a system to create XML-based (or other standard language or protocol) messages for sending among heterogeneous systems. The systems associated with the proxies in FIG. 2 are not illustrated, but may perform and send messages through the PI domain 205 similar to the systems associated with the adapter engines. As described above, the proxies, whether Java- or ABAP-based, as well as the adapter engines, are used to send and receive messages between heterogeneous systems in the illustrated environment 200. As illustrated, the adapter engines and proxies exchange messages with the integration server 215, which can interpret the messages to determine the location or entity to which the messages are to be delivered. The integration server 215 can modify the messages as needed, including translation and/or addressing (based on defined message mappings), prior to sending the messages on. Information regarding the messages being sent via the integration server 215 can be locally monitored, with the relevant information stored at the integration server 215 (or a communicably coupled location) for later use and analysis.

As illustrated by arrows 255, messages are sent between the various PI components (i.e., the adapter engines and proxies). Each of the messages illustrated in FIG. 2 are sent to the integration server 215, where those messages are relayed to the appropriate recipient. Although not illustrated, the adapter engines and proxies can send some or all of the messages directly to their respective recipients. Each of the PI components, as well as the integration server 215, can locally collect information and metadata associated with the information from the messages passing through or by the components, as well as copies of the messages and/or the messages' payload data. Users can access the information on a component-by-component basis to view or review the messages sent through the PI domain. However, as illustrated by the arrows 260, the solution manager server 210 can access each of the PI components and the sets of monitored information in order to pull that information into a single repository located at or accessible to the solution manager server 210 and its associated central monitoring application. Additionally, the solution manager server 210 can access local message stores associated with each PI component to access the actual messages themselves. In some instances, the solution manager server 210 can also access one or more message archives where archived messages associated with particular PI components are stored. The solution manager server 210 can access the information stored at (or associated with) the various PI components using APIs exposed by the PI components (or their associated systems) as described in FIG. 1A. The collected information can be aggregated and/or correlated in order to match outgoing messages from one system to incoming messages from another system. In some instances, the solution manager server 210 may perform various aggregation and correlation applications and functionality in order to match related messages. The solution manager server 210 can also use local functionality associated with each PI component (i.e., via one or more APIs) to use or request the execution of local search functionality of the respective PI component.

A group of related messages may be considered successful when the final message of the group leaves the PI domain 205. For example, a message may be sent from the JMS system 228 (via the adapter engine 230) to the file system 234 (via the adapter engine 236). Once the message is provided to the file system 234, which is considered external to the PI domain 205, the message may be considered a success. If no errors have been identified for a particular group of related messages, but the final message has not left the PI domain, the group of related messages may be considered "temporarily successful." Temporarily successful messages may represent messages that have not completed their processing and routing through the PI domain, as well as messages that are stalled at some point in their path but that have not yet been identified as "unsuccessful," or that have not yet resulted in an error or exception. In some instances, once "temporarily successful" groups of messages have exceeded a particular time period or threshold, they may be considered "unsuccessful," and the system may return an error. If an error has occurred and been identified for a particular group of related messages, those messages may be considered "unsuccessful."

As illustrated, the information stored at each individual component can be accessed and retrieved by the solution manager server 210 (illustrated by arrows 260). The solution manager server 210 may be associated with a plurality of PI domains other than the illustrated PI domain 205. In those instances, information about the other PI domains may be stored in the same or a different repository than the collected and retrieved information associated with the illustrated PI domain 205. When a technical user first accesses a monitoring application dashboard on the solution manager server 210 (i.e., associated with the central monitoring application 145 of FIG. 1A), the first action for the user may be to select a particular PI domain for viewing. The solution manager server 210 can then prepare a corresponding dashboard or other manner of presenting information specific to the selected PI domain. In this manner, the solution manager server 210 can be used in association with different PI domains and their associated components, including some PI domains where some physical components may be shared across the PI domains.

Figure 3:
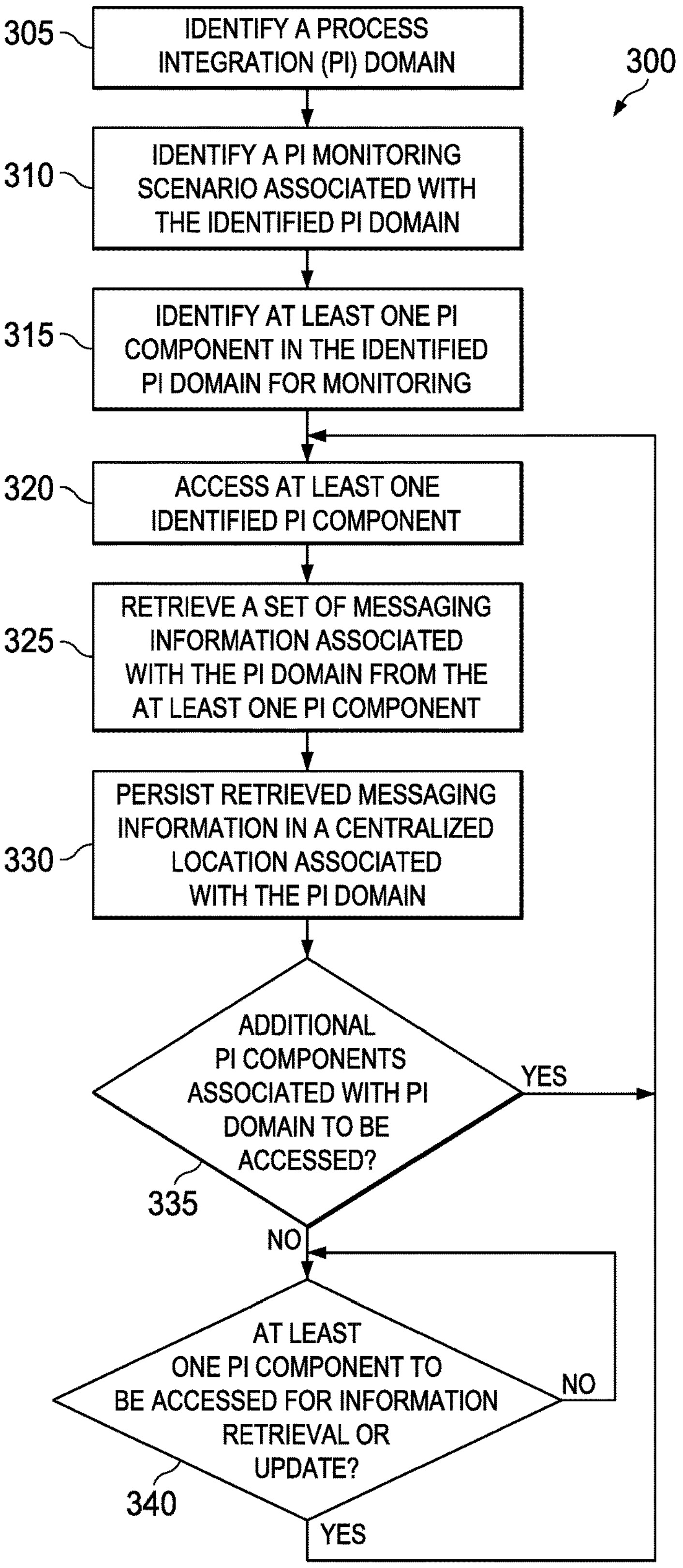
FIG. 3 is a flowchart of an example process for collecting information associated with two or more distributed PI components at a central location using an appropriate system, such as the system described in FIG. 1A.

FIG. 3 is a flowchart of an example process 300 for collecting information associated with two or more distributed PI components at a central location using an appropriate system, such as the system and environment 100 described in FIG. 1A. For clarity of presentation, the description that follows generally describes method 300 in the context of environment 100 illustrated in FIG. 1A. However, it will be understood that method 300 may be performed, for example, by any other suitable system, environment, or combination of systems and environments, as appropriate.

At 305, a PI domain is identified for monitoring. In some instances, a plurality of PI domains may be available for monitoring, such that the identified PI domain may be one of multiple PI domains associated with a central monitoring application (e.g., central monitoring application 145 in FIG. 1A). Further, identifying a PI domain for monitoring may be a result of a manual selection provided by a user or administrator, as well as an automatic and/or dynamic selection based on one or more monitoring settings identified at or associated with the central monitoring application. Where multiple PI domains are available, the schedules for monitoring those PI domains may differ such that the central monitoring application may perform the operations associated with method 300 at different times—or in response to different events—for each PI domain.

At 310, a PI monitoring use scenario associated with the identified PI domain is identified. The PI monitoring use scenario can determine the frequency of data collections performed, as well as the type of data to be collected. Different monitoring use scenarios may include an operational monitoring scenario (e.g., general information at lower frequencies), a testing monitoring scenario (e.g., more information at higher frequencies), and a customized monitoring scenario (e.g., an at least partially user-defined scenario providing user-specified monitoring specifications), among others. In some instances, a PI monitoring use scenario may cause certain PI components to be accessed and their information collected on a different schedule or data mined for different information than other PI components within the same PI domain. In other instances, the PI monitoring use scenario may collect the same type of information from each PI component on a consistent schedule.

At 315, at least one PI component within the PI domain is identified for monitoring. The PI components to be monitored can be defined within a PI domain model associated with the identified PI domain, where the PI components and their relationship to each other and to a specific process can be defined. The PI domain may have been defined manually, or the PI domain may be automatically or dynamically defined based on information associated with the PI components including information on one or more integration scenarios, messaging interactions, or other related events or operations performed between one or more system components associated with the corresponding PI components. In some instances, the central monitoring application (or other component) performing method 300 may access the PI components sequentially, while in other instances, at least some of the PI components may be accessed concurrently.

At 320, an identified PI component is accessed. The central monitoring application (or other collection component) will execute in certain defined (and customizable) intervals. The central monitoring application accesses the information by accessing the data collected and stored locally on or associated with each PI component. In some instances, an agent, module, or portion of the central monitoring application (or other collection component) may be included as part of one or more of the PI components, allowing the agent or module to collect the information and provide the information to the central monitoring application at appropriate intervals. In the present example, the PI component can be accessed via one or more APIs associated with a local monitoring tool associated with the PI component and/or APIs associated with the PI component itself. In other instances, the central monitoring application may directly access the stored information in the one or more memories associated with the PI component and its underlying application (or technical) system. In some instances, more than one PI component may be associated with a single technical system, such as where a single technical (or application) system performs multiple operations and/or functionality.

At 325, a set of relevant messaging information associated with the PI domain is retrieved from the identified PI component. Again, the retrieval of the relevant messaging information may be performed via APIs associated with the identified PI component, a local monitoring tool associated with the identified PI component, through direct accessing of messaging information stored at the underlying technical or application system, and through other suitable methods. The set of messaging information may be determined at least in part by the PI monitoring scenario identified at 310, which may provide a generic set of information to be retrieved for each PI component within the PI domain, as well as specific sets of information to be retrieved for specific PI components. An example of the information retrieved may include message metadata (e.g., integration scenarios, technical channels, and other information related to the messages), statistics associated with the messages (e.g., a number of similar messages received, etc.), and status information regarding the messages (e.g., whether a message was successfully passed to its recipient, whether an error occurred during message processing, etc.).

At 330, the retrieved (or collected) messaging information from the identified PI component is persisted to a centralized location associated with the PI domain. In some instances, the retrieved messaging information can be persisted within a memory or database solely associated with a single PI domain, while in other instances, the messaging information may be stored in a memory or database common to multiple PI domains. The retrieved messaging information can be associated with a PI domain identifier or within a particular table or set of entries associated with the PI domain to assist the central monitoring application in identifying the information associated with a particular PI domain.

At 335, a determination is made as to whether additional PI components within the PI domain are to be accessed and their associated information is to be retrieved. If no additional PI components within the PI domain are to be accessed, method 300 continues to 340. If, however, additional PI components associated with the PI domain are to be accessed, method 300 returns to 320, where the next PI component is accessed and the messaging information is retrieved. Messaging information may be retrieved differently (i.e., via different mechanisms) for one or more of the PI components. In some instances, two or more PI components may be concurrently accessed by the central monitoring application, such that messaging information is collected from different PI components at the same (or overlapping) times.

At 340, a determination is made as to whether one or more PI components are to be re-accessed to retrieve new messaging information. In some instances, this determination may be based on the PI monitoring scenario currently associated with the PI domain, as well as various settings associated with the central monitoring application. For instance, some monitoring scenarios may require information to be accessed at regular intervals. If the interval is met, the determination at 340 will be "yes" and return to 320, where the PI component is re-accessed according to the monitoring scenario. Additionally, certain identified events, including a user request for updated information, may cause at least one PI component to be accessed again. If the determination of 340 is "no," method 300 waits until another PI component is to be accessed and updated or until the monitoring of the PI domain ends.

Figure 4:
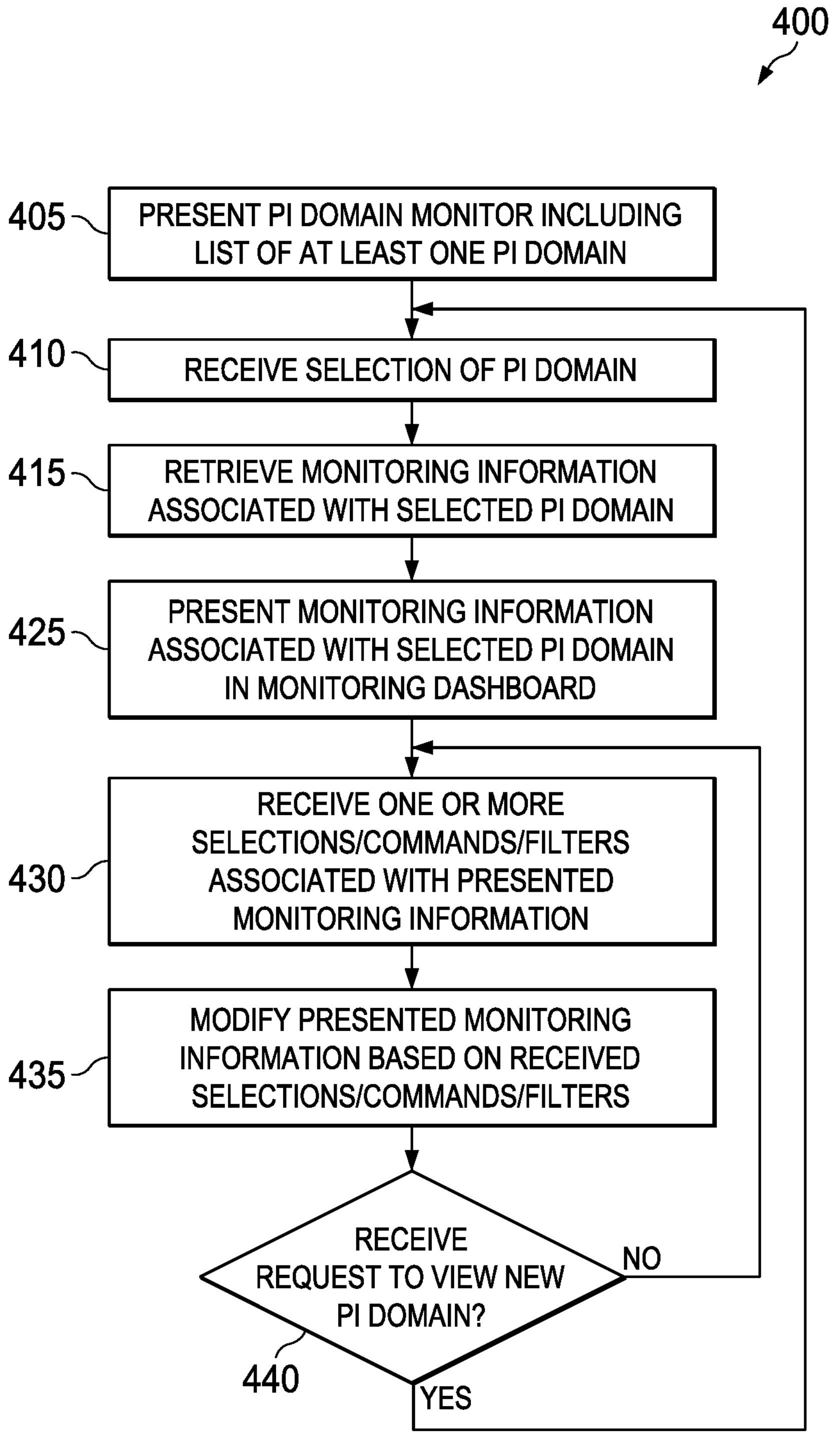
FIG. 4 is a flowchart of an example process for presenting information associated with a set of collected information from at least one PI domain and its PI components using an appropriate system, such as the system described in FIG. 1A.
Figure 6A:
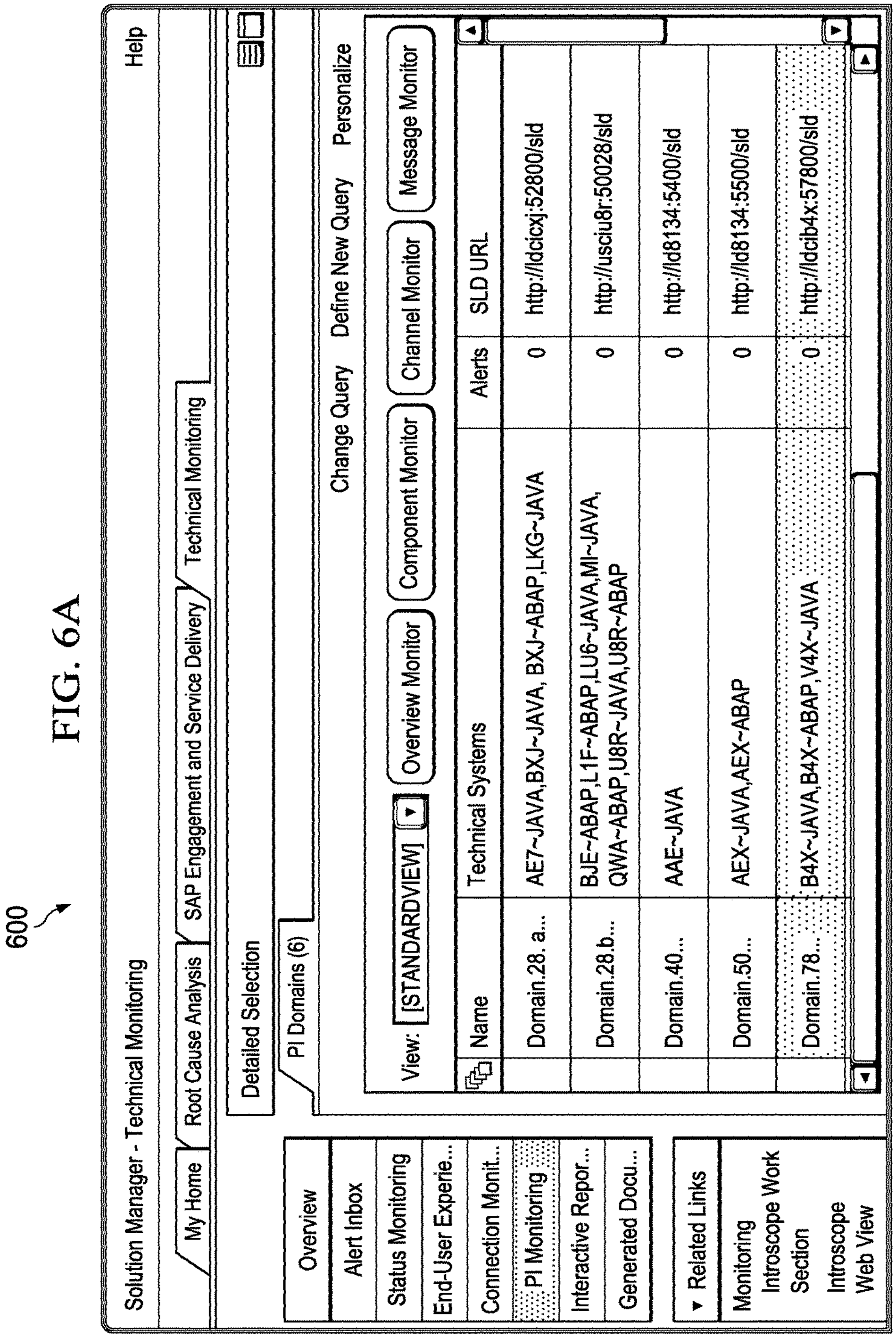

FIG. 4 is a flowchart of an example process 400 for presenting information associated with a set of collected information from at least one PI domain and its PI components. At 405, a PI domain monitor is presented, where the PI domain monitor includes a list of at least one PI domain being monitored. Presenting the PI domain monitor 600 of FIG. 6A may include presenting a generated dashboard at a client through a GUI using a client-based application, such as a web browser. FIG. 6A presents an example of a PI domain monitor dashboard presented via a client-based GUI, where the information is accessed through a web service or web-based application associated with (or a part of) the central monitoring application. In the illustrated example, five (5) different PI domains are shown in the monitor, and represent the five (5) PI domains monitored by the associated central monitoring application. In some instances, presenting the PI domain monitor 600 may be initiated by addressing a web browser or client application to a web address (or web-based application) associated with a particular central monitoring application.

Returning to FIG. 4, at 410 a selection of a particular PI domain is received. In some instances, the selection can be received through the GUI (or other input/output component) at the client where the PI domain monitor is presented. The selection of the particular PI domain may be received via any appropriate input, including a mouse-click, a keyboard shortcut, a voice input, or any other suitable entry. In some instances, where a single PI domain is presented with the PI domain monitor, the selection of the sole PI domain may be automatic.

Figure 6B:
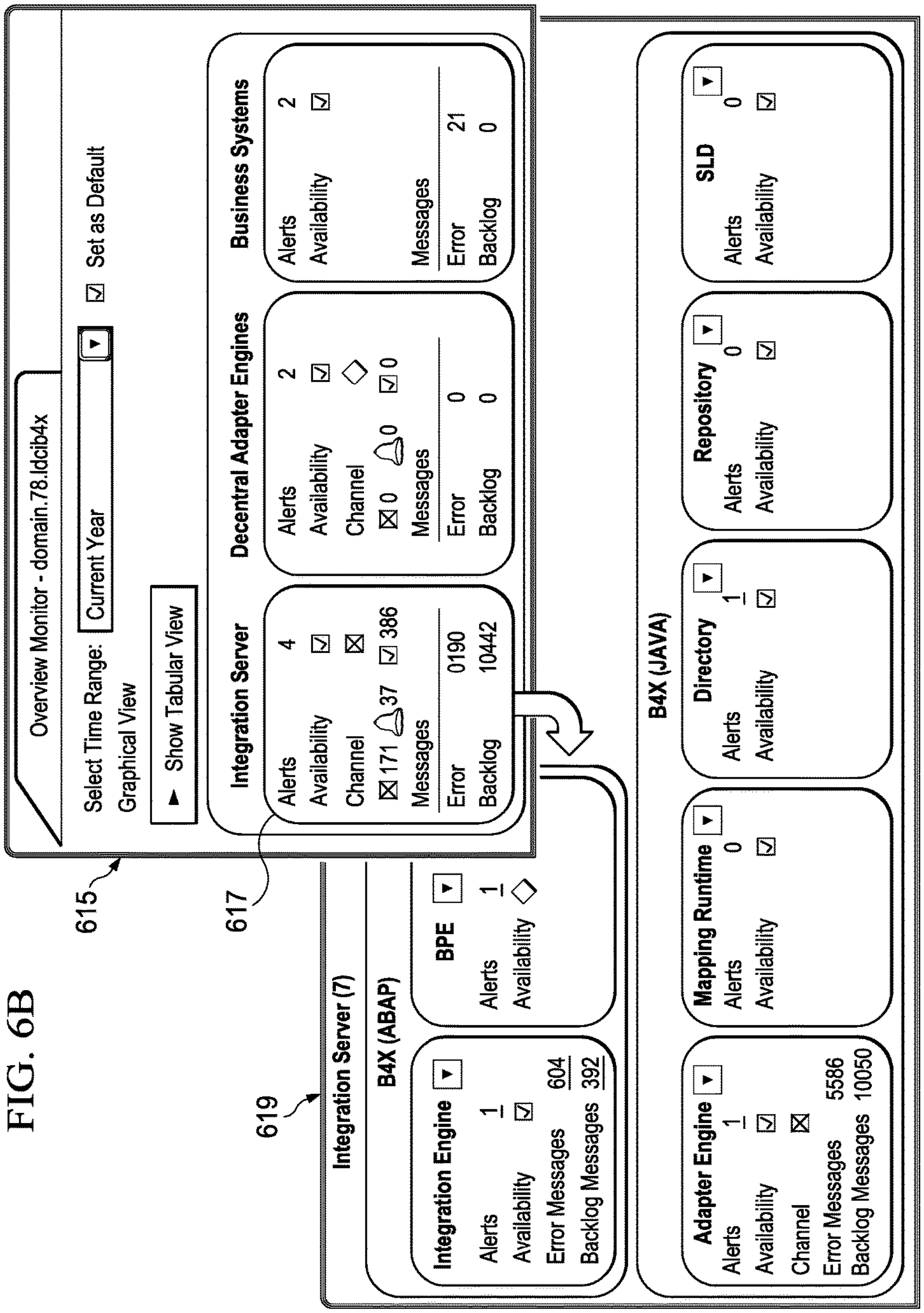

At 415, a set of monitoring information associated with the selected PI domain is retrieved from a persisted location (or locations). At 425, the retrieved monitoring information associated with the selected PI domain is presented in the monitoring dashboard. FIG. 6B illustrates an example presentation of such information in an overview monitor 615 for a selected PI domain. As illustrated, information is presented in an organized and aggregated manner for different PI and technical components within or associated with the PI domain. For example, FIG. 6B presents three primary components within the selected PI domain, the integration server 617, a set of adapter engines, and the associated or connected business systems. Further, when the integration server 617 (or another PI component) is selected, additional information associated with the integration server and its messages is presented in an individual view 619 associated with the selected PI component (in FIG. 6B, presenting information associated with both a ABAP-based and Java-based messages represented by B4X(ABAP) and B4X (JAVA)). General information associated with the alerts and other monitoring information associated with the PI domain is presented in both the overview monitor 615 and the more detailed individual component view 619, with technical users being able to select UI elements associated with that information to access and present additional information.

Figure 6C:
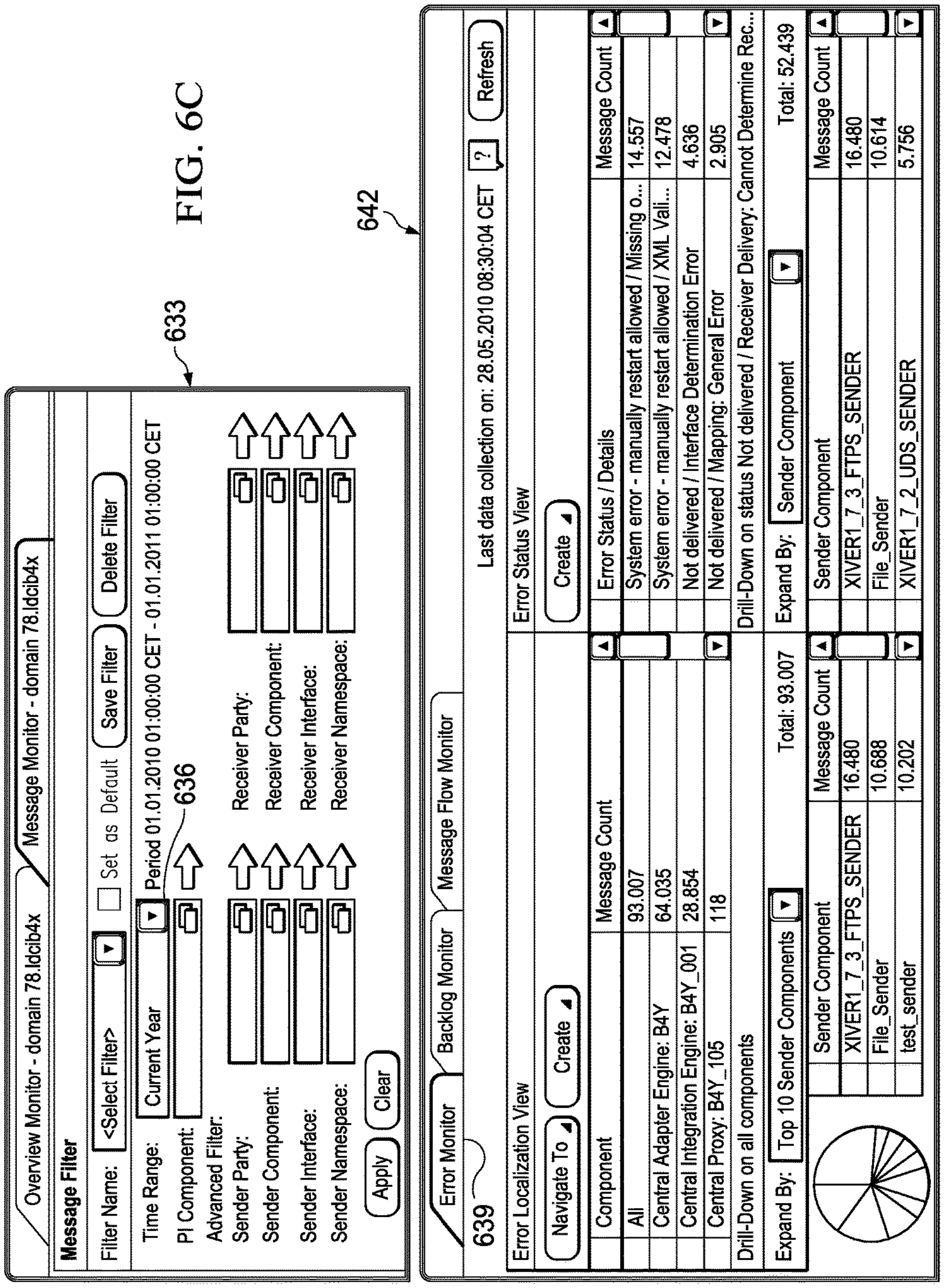

Returning to FIG. 4, at 430 one or more selections, commands, or filters associated with the presented monitoring information may be received. The selections, commands, and filters may include various types of input, including mouse-clicks upon certain elements within the presented dashboard, user input provided via filter boxes to determine the type or dates of certain data to be presented, and dropdown box selection of predetermined filter criteria. FIG. 6C illustrates an example of the information presented within a particular portion of the generated dashboard. Specifically, FIG. 6C illustrates an example message monitor 633 where specific message filters can be applied. In the illustrated example, the filter applied is for messages from the current year (as selected via the dropdown box 636). Once the filter is applied, the presented monitoring information is modified based at least in part on the received selection, command, or filter (435 of method 400). In the illustrated example of FIG. 6C, a detailed set of information associated with the filter is presented in a new window 642. The new window 642 provides three separate monitoring views—an error monitor 639 (as illustrated in FIG. 6C), a backlog monitor, and a message flow monitor. FIG. 6C illustrates the message error monitor 639, where information on messages receiving errors can be presented. As illustrated, an error localization view provides information on the components at which errors have occurred in a table view. An error status view provides a listing of the error details for messages, as well as the number of messages (or related messages) receiving the same error. Additional information associated with a selected entry or value may be provided, including various drill-down menus and graphs provided within the illustrated dashboard. With each selection by a user, the dashboard can be modified (i.e., at 435 of method 400) to present the information associated with the received request, command, or filter. At 440 of FIG. 4, a determination is made as to whether a request to view another PI domain is received. If so, method 400 returns to 410, where the new PI domain is selected and the associated dashboard and messaging information is presented. If not, method 400 returns to 430 where a wait for new commands, selections, and filters is performed.

Figure 6D:
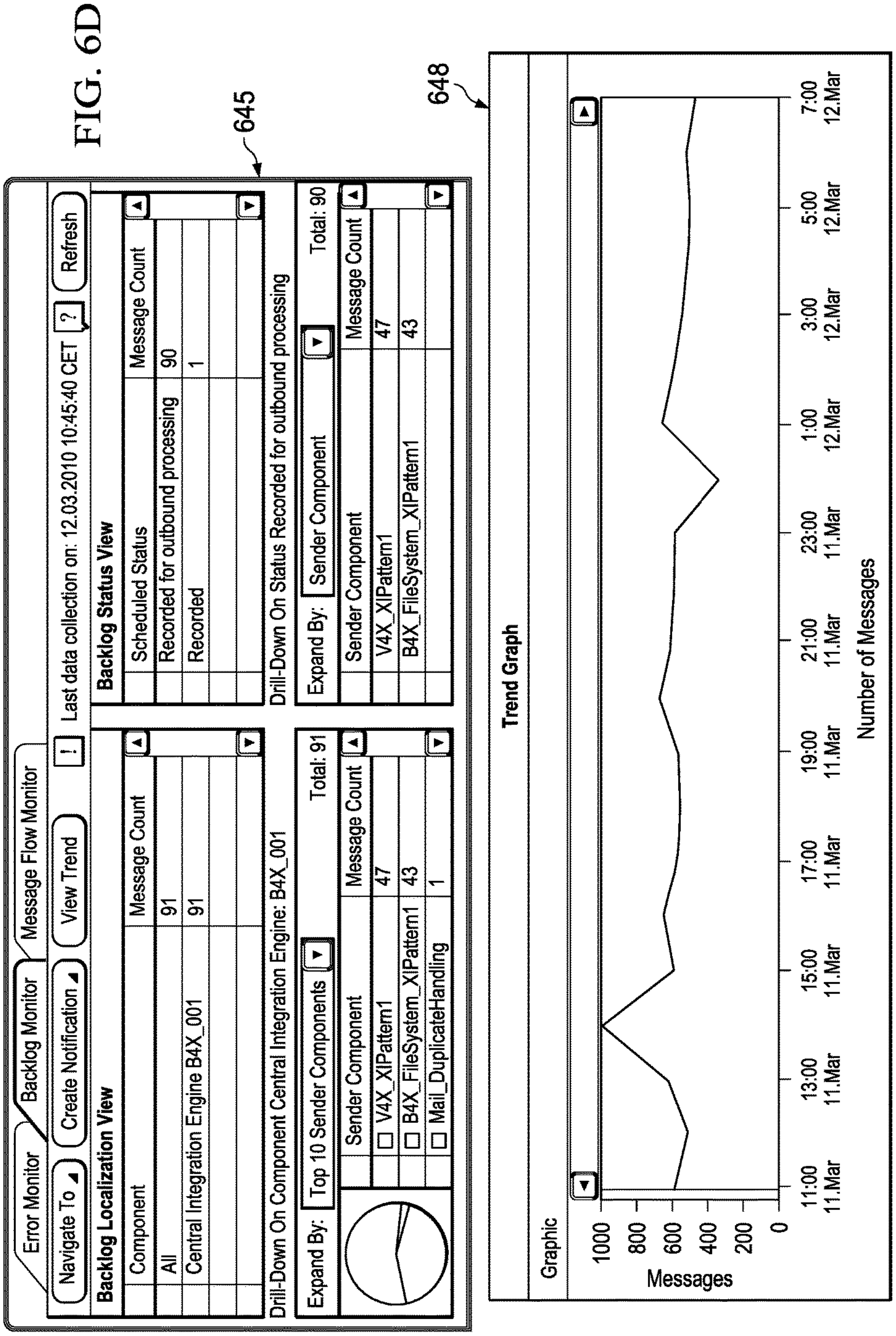

FIG. 6D presents a backlog monitor 645. As the error monitor 639 (shown in FIG. 6C) presents only information associated with messages having errors, the backlog monitor 645 presents only information associated with messages that are in an intermediate state—that is, messages that have not completed their intended processing, whether that is due to continuing processing or incomplete processing that has not finished for some unknown reason that is not directly connected to a known error. As illustrated, various visualizations associated with the backlog monitor 645 can be provided, including the trend graph 648 illustrating the number of messages in a backlog status over a defined period of time. The backlog monitor 645 can be used in connection with method 400 in place of the error monitor, as well. FIG. 6E presents a message flow monitor 660 where a collected set of completed, backlogged, and error-related messages can be viewed. In some instances, the sender components, sender interfaces, receiver components, and receiver interfaces can be listed, with various information and statistics on the messages sent between them provided. Different PI components can be viewed in more detail, and particular types of messages can be retried, reinitiated, and resent through user requests entered through the dashboard. In some instances, whether viewing the error monitor, the backlog monitor, or the message flow monitor, users may be able to navigate to a local PI monitor associated with a selected message and/or a PI component in order to work on and/or fix local issues at a technical or application system.

Figure 5A:
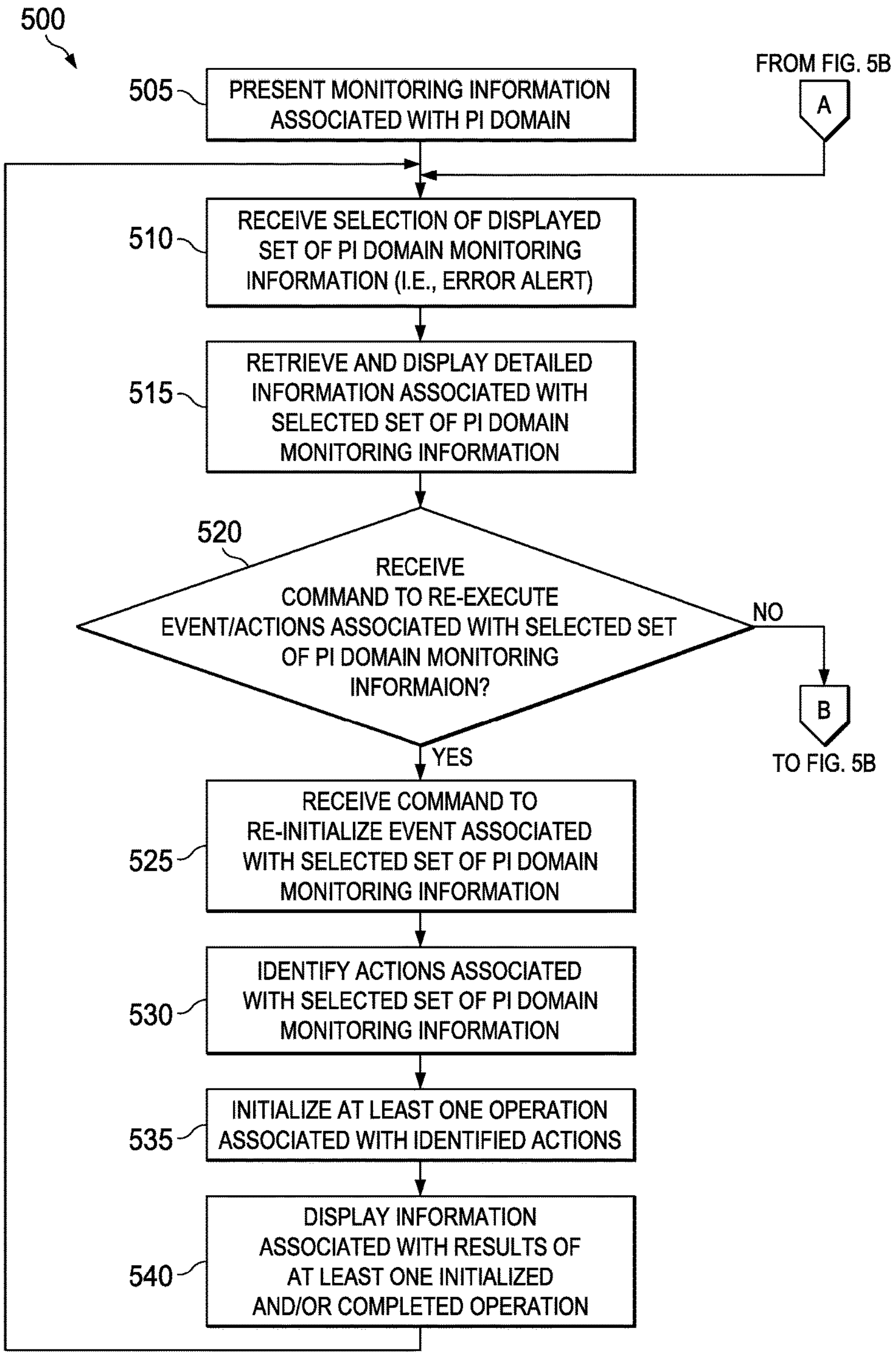
FIGS. 5A and 5B are a flowchart of an example process for interacting with presented information associated with a set of collected information from at least one PI domain and its PI components using an appropriate system, such as the system described in FIG. 1A.
Figure 5B:
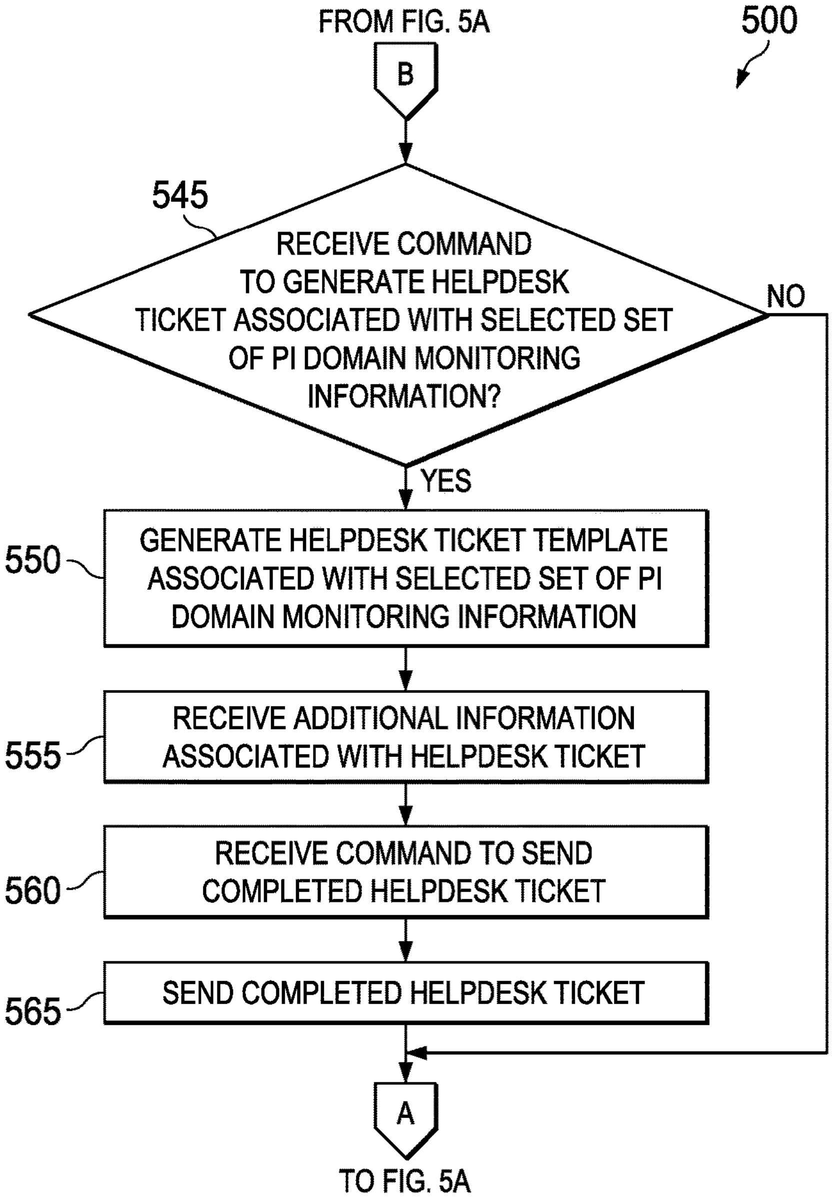

FIGS. 5A and 5B are a flowchart of an example process 500 for interacting with presented information associated with a set of collected information from at least one PI domain and its PI components. Specifically, FIGS. 5A and 5B illustrate one example method 500 for restating messages in which errors, exceptions, or other issues have occurred or are to be tested, or, alternatively, generating a helpdesk ticket within or associated with the presented dashboard to address the identified issues. In some instances, both the restarting/reinitiating of messages and the creation/generation of helpdesk tickets may be performed by a user interacting with the presented information (i.e., the dashboard).

At 505, monitoring information associated with a particular PI domain is presented, such as in the example dashboards described herein. In some instances, the monitoring information may already be presented or may be in a particular state after the information's initial presentation. At 510, a selection of a displayed set of PI domain monitoring and messaging information is received. For example, information associated with a particular error alert or backlogged message can be selected. At 515, detailed information associated with the selected set of PI domain monitoring information can be retrieved and displayed, such as in one of the example dashboards described herein. At 520, a determination may be made as to whether a command or request to re-execute or re-initiate an event or action associated with the selected set of PI domain monitoring information is received. The command/request may be received through one of the dashboards presented to a user, particularly where one or more messages are associated with an error or backlog via the error monitor or the backlog monitor. Users may be provided with the ability to ask for messages to be reinitiated to check whether an error or issue is continuing, or whether an error or delayed execution (in the backlog case) continues. If such a request is received, method 500 continues at 525. If such a request is not received, method 500 moves to 545.

At 525, the command to reinitiate or re-execute one or more messages associated with the selected set of PI domain monitoring information is received. At 530, the actions or events associated with the selected set of PI domain monitoring information (i.e., the identified messages) is identified. In some instances, the presented monitoring information may identify or be associated with a particular message type, message sender, message receiver, and related information. Some of that information may be readily available, while in others, the central monitoring application may analyze the selected set of PI monitoring information to determine the associated PI components (and corresponding technical systems).

At 535, at least one operation associated with the identified actions or events is initialized. In some instances, the central monitoring application may have established connections with the technical systems containing or associated with the PI components within the particular PI domain. Information on these connections, including one or more APIs, can be used by the central monitoring application to access the functionality of the underlying technical system, allowing the central monitoring application to initiate, restart, or cancel messages in the PI domain and associated with the technical system. The central monitoring application can provide the necessary values and information to the technical system to perform the associated operation, event, or action. Once the at least one operation, event, or action is restarted, the normal monitoring activities of the central monitoring application may continue. In some instances, the known PI components associated with the particular operations may be monitored on a higher frequency in order to follow one or more messages associated with the event, allowing for real-time or near real-time monitoring of the restarted message or messages and their relative success or failure. At 540, information associated with the results of the at least one initialized operation can be displayed or presented, such as within the dashboards described herein, as well as in one or more new windows or displays presented in or concurrently with the dashboards. Once the results are displayed, method 500 returns to 510, where the steps can continue.

Returning to the determination of 520, where no commands or requests to re-execute or reinitiate events are received, method 500 continues at 545. In some instances, method 500 may concurrently perform operations 525-540 and the operations of 545-565. Further, in some instances, the operations 545-565 may be performed before the operations of 525-540. In general, the operations of 545-565 allow users to generate a helpdesk ticket based on the selected information from 510. In some instances, if the operations of 525-540 demonstrate that previously-identified issues remain, the operations of 545-565 may be used to generate the helpdesk ticket.

At 545, an initial determination is made as to whether a command or request to generate a helpdesk ticket associated with the selected set of PI domain monitoring information can be made. If no such request or command is received, method 500 can return to 510. If, however, such a request or command is received, method 500 continues at 550. At 550, a helpdesk ticket template associated with the selected set of PI domain monitoring information can be generated. In some instances, a generic helpdesk ticket may be used with information derived from the selected set of PI domain monitoring information being used to fill in at least a portion of the generic template. At 555, additional information associated with the generated helpdesk ticket may be received, such as information provided by the user including notes, additional details, or an importance/severity level, for example. Additionally, one or more of the automatically generated portions of the helpdesk ticket can be modified by the user. At 560, a command or request to finalize and send the completed helpdesk ticket may be received. At 565, once the command is received, the helpdesk ticket is completed and sent to the appropriate user or administrator. In some instances, information on the technical system(s) associated with the selected set of PI domain monitoring information may be used to determine the appropriate user or administrator to whom to address the completed helpdesk ticket, while in other instances, the ticket may be sent to a general helpdesk account or a manually-specified user or account. Method 500 then returns to 510 where a new set of PI domain monitoring information can be selected.

Figure 7:
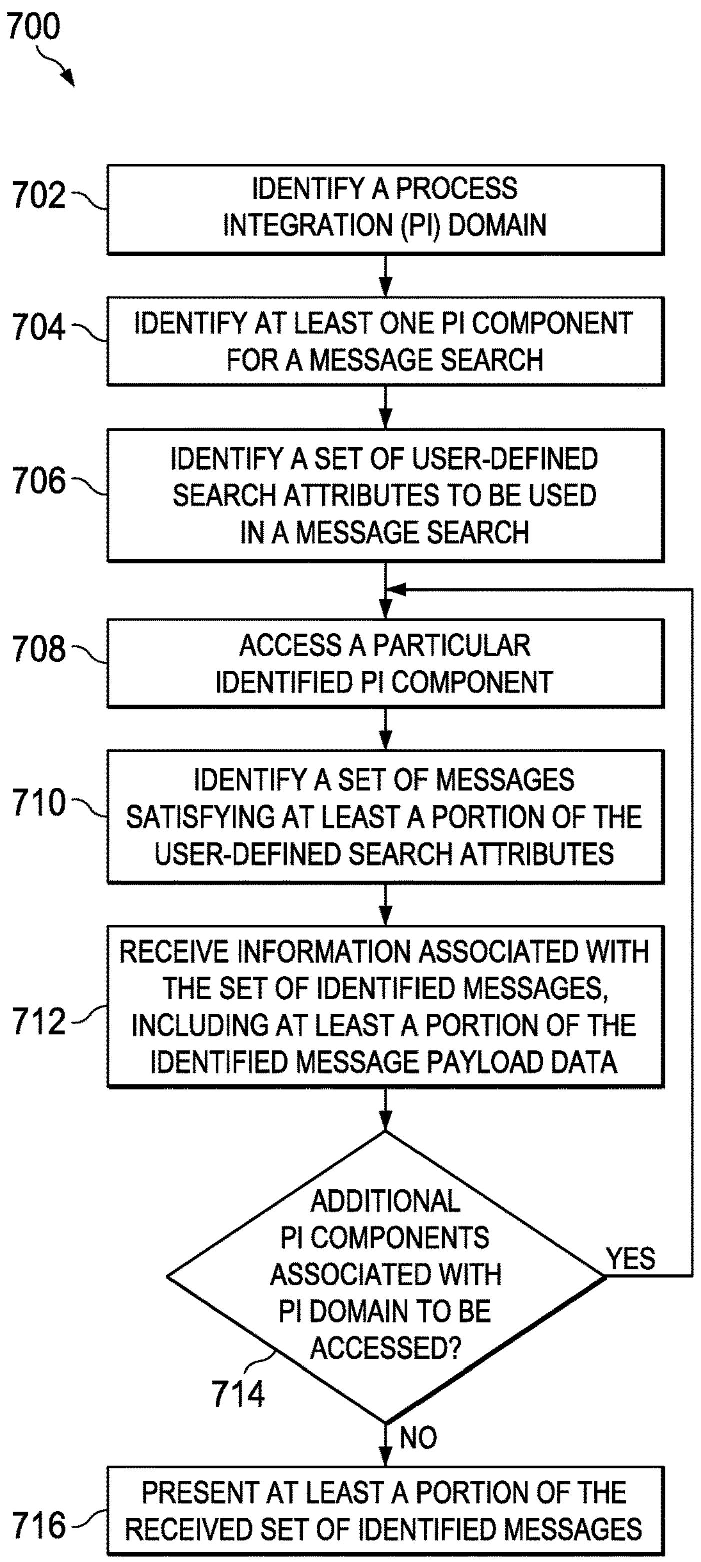
FIG. 7 is a flowchart of an example process for performing a centralized user-defined message search within a particular PI domain using an appropriate system, such as the system described in FIG. 1A.

FIG. 7 is a flowchart of an example process 700 for performing a centralized user-defined message search within a particular PI domain using an appropriate system, such as the system and environment 100 described in FIG. 1A. For clarity of presentation, the description that follows generally describes method 700 in the context of environment 100 illustrated in FIG. 1A. However, it will be understood that method 700 may be performed, for example, by any other suitable system, environment, or combination of systems and environments, as appropriate.

At 702, a PI domain is identified for message searching. Identification of a particular PI domain may be performed as described in association with 305 in FIG. 3, such as a manual selection by a user as well as a dynamic or automatic selection based on a scheduled event or in response to one or more actions within a particular environment or system operable to execute in the background of an authorized user's or entity's system. The scheduled search can be useful in instances of large search result sets, removing the need for a user to wait idly while a search is performed. With a background execution, the message search can run, and when complete, the corresponding user can login or refocus on a message search screen/window to review the output and results of the search.

At 704, at least one PI component within the identified PI domain (or domains) is identified for a particular centralized message search. The PI components may again be manually selected by a user or client interacting with the centralized search functionality, or may be selected, for instance, based on a predefined report or message search. Because some reports may be run multiple times and/or on a regular basis, particular searches may be predefined (both search attributes and corresponding PI components) may provide quicker results or submissions of search information as compared to requiring the selections to be re-entered. The identified PI components and their associated messages will be searched when the search request is finalized and submitted.

At 706, a set of user-defined search attributes are identified for use in the current search. Similar to the PI components, the search attributes can be manually selected or can be automatically or dynamically chosen. The user-defined search attributes can be based on message metadata, related entities or components, and message payload data, among others. Certain search attributes may be predefined and associated with particular PI components to allow for repeated searches, analysis, and reporting. In addition to the selection of a particular attribute, a value associated with the attribute is also identified. For example, the search attribute may be associated with a particular field, such as "Firstname." The corresponding value for the search attribute may be defined as "Jonath*", where "*" represents a wildcard entry.

At 708, a particular one of the identified PI components associated with the centralized message search is accessed. In some instances, the centralized message searching functionality can use the local search functionality associated with the identified PI components. In some instances, one or more APIs associated with the identified PI component may expose the local search functionality, such that the central monitoring application can use the exposed methods and interfaces of the local search functionality to be provided access to the identified PI component. In other instances, the central monitoring application may send a request to the identified PI component to perform the search locally and return the results.

At 710, a set of messages satisfying at least a portion of the user-defined search attributes and corresponding values is identified. The set may be identified locally at the local PI component, or the set of messages, or search results, may be sent to the central monitoring application. At 712, the information associated with the set of identified messages is received, with that information including at least a portion of the message payload data associated with the identified messages. In some instances, a person, user, or entity submitting the search may not be authorized to view or access some or all of the message payload data, such as a technical analyst searching human resources-related messages. In those instances, only the portions of message payload data that can be viewed by the submitting entity may be returned. In other instances, only a subset of the message payload data may be requested from the local PI component, with only the requested message payload data being returned.

At 714, a determination is made as to whether additional PI components are to be accessed for local message searching. If so, method 700 returns to 708 and an additional PI component is accessed to perform the message search. In some instances, the searching of two or more identified PI components can be performed concurrently. If no additional PI components remain, method 700 continues at 716, where at least a portion of the received set of identified messages is presented, such as via a suitable user interface associated with the searching entity. In some instances, a portion of the message payload data can be presented as well, while in others, only message metadata may be presented. Additional review of the messages and their message payload data may be performed via the user interface and a PI dashboard used to present the search results.

Figure 8:
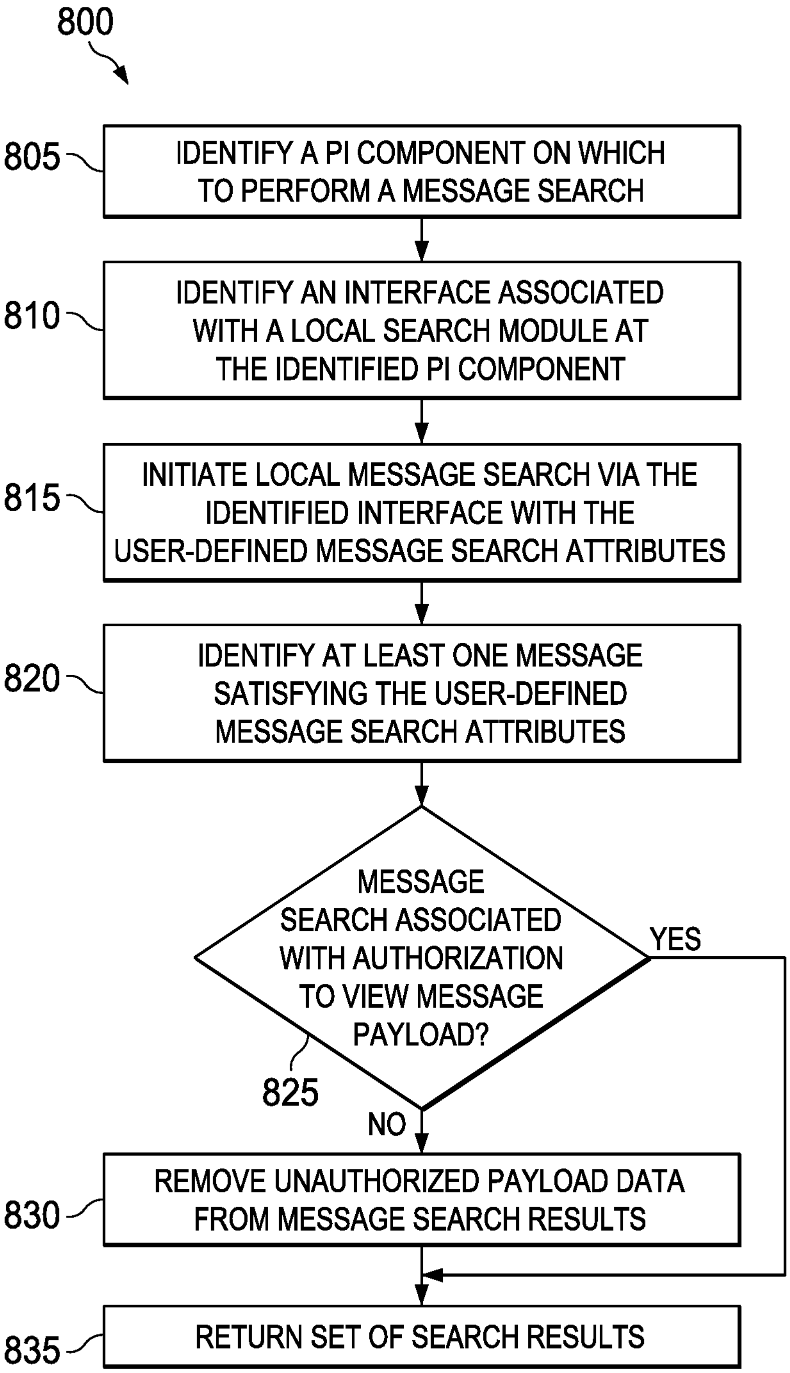
FIG. 8 is a flowchart of an example process for accessing and receiving messages and message-related information from a particular PI component associated with a centralized message search using an appropriate system, such as the system described in FIG. 1A.

FIG. 8 is a flowchart of an example process 800 illustrating operations associated with accessing and receiving information from a particular PI component. For clarity of presentation, the description that follows generally describes method 800 in the context of environment 100 illustrated in FIG. 1A. However, it will be understood that method 800 may be performed, for example, by any other suitable system, environment, or combination of systems and environments, as appropriate.

At 805, a particular PI component at which local message searching is to be performed in the context of a larger, centralized message search within a PI domain is identified. At 810, an interface associated with the particular PI component is also identified, where the interface is associated with a local message search module (or functionality) at the particular PI component. The interface may be an API, a messaging interface, or any other suitable interface for allowing outside components to interact with and take advantage of the internal, local message search capabilities of the particular PI component. Different PI components may be associated with different types or implementations of local message search functionality interfaces, and any suitable type of interface may be used.

At 815, the local message search functionality of the particular PI component can be initiated via the identified interface, with a local search being performed based on at least one user-defined message search attribute. The search attributes can be associated with message payload data, message metadata, or any other suitable field or attribute of messages exchanged with the PI domain. In some instances, the local message search functionality can search a local message store located at or associated with the particular PI component. Additionally or alternatively, the local message search functionality may search a message archive associated with the particular PI component. The search attributes may specific messages of different types (i.e, archived and non-archived), or may define a particular time period that determines whether a particular message location is to be searched. In addition to the selection of a particular attribute, a value associated with the attribute is also identified. For example, the search attribute may be associated with a particular field, such as "Firstname." The corresponding value for the search attribute may be defined as "Jonath*", where "*" represents a wildcard entry. At 820, at least one message satisfying the user-defined message search attributes and corresponding values is identified.

In some instances, the searching entity may not have proper authorization to view at least a portion of the payload data within one or more messages. At 825, a determination is made as to whether the current message search and the searching entity is associated with the proper authorization to view all or some of the message payload data in the at least one identified messages. If the proper authorization is not found, the message payload data that the searching entity is not authorized to view can be removed from the applicable messages or message information in the search results, then continuing at 835. If the proper authorization is found, method 800 continues at 835 where the messages from the particular PI component satisfying at least a portion of the message search attributes are returned as the search results. The messages and their corresponding payload data can be returned to the central monitoring application for aggregation with any other PI components associated with the search, and presented to the user or searching entity within an appropriate PI dashboard.

Figure 9:
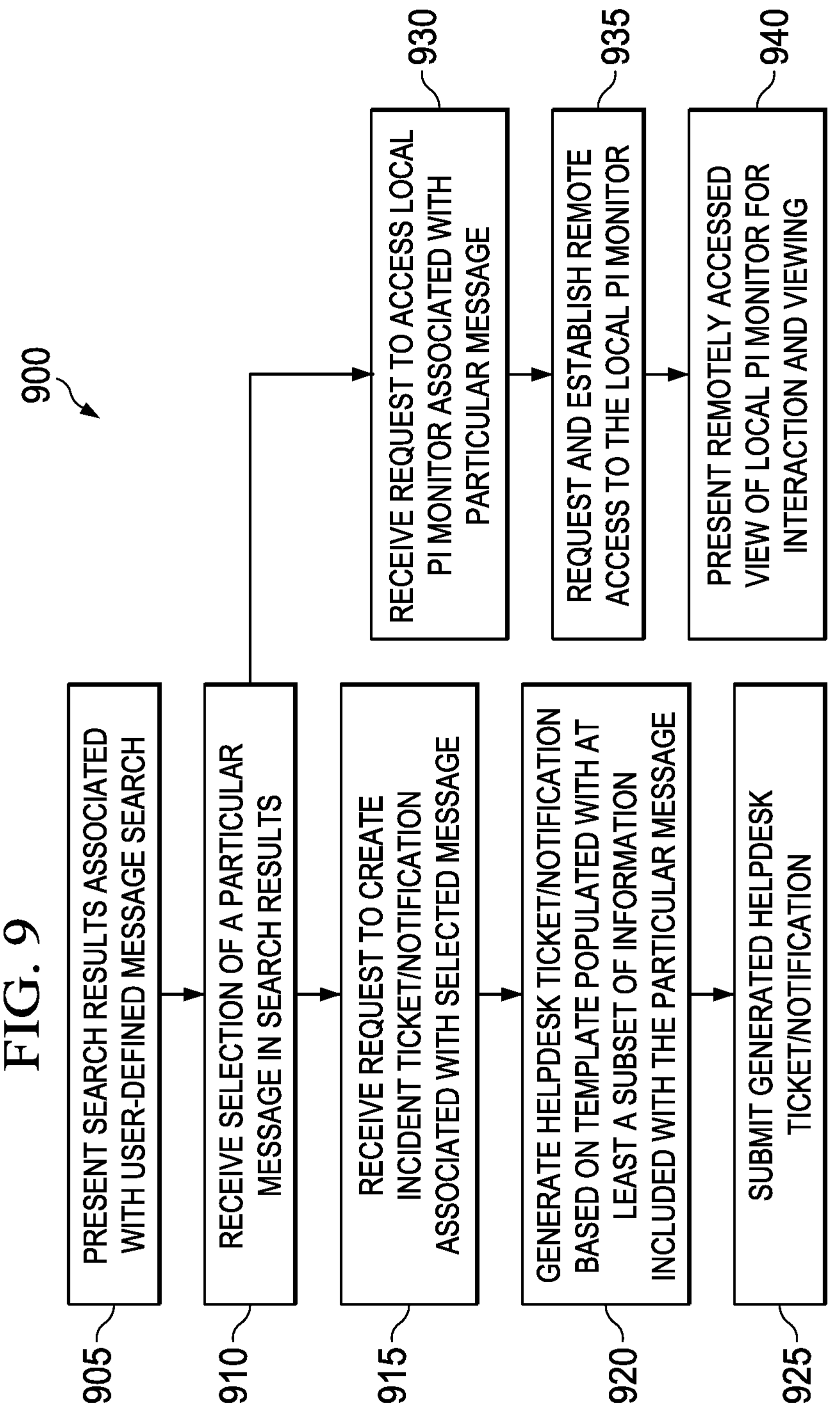
FIG. 9 is a flowchart of an example process for interacting with the set of search results returned by a centralized message search associated with a particular PI domain and set of PI components using an appropriate system, such as the system described in FIG. 1A.

FIG. 9 is a flowchart of an example process 900 for interacting with the set of search results returned by a centralized message search associated with a particular PI domain and set of PI components. For clarity of presentation, the description that follows generally describes method 900 in the context of environment 100 illustrated in FIG. 1A. However, it will be understood that method 900 may be performed, for example, by any other suitable system, environment, or combination of systems and environments, as appropriate.

At 905, the search results associated with a search are presented to the searching entity or user associated with the search. The search results can be presented, for instance, as illustrated in FIG. 11C. In some instances, the list of messages included in the search results can include dynamic columns and entries corresponding to the search attributes and their corresponding values defined for the search attributes. At 910, selection of a particular message included in the presented search results is received. The selection may include any suitable indication or selection technique of a particular message in the search results, including a mouse-click, mouse-hover, touch input, voice input, among others.

Method 900 illustrates several possible actions that can be performed within the search results. These actions are merely examples, as other suitable operations and actions can also be used with the present disclosure. The first action is the creation of an incident ticket and/or a notification associated with the selected message. At 915, a request to create such a ticket or notification associated with the selected message is received. At 920, the ticket or notification is generated based on a corresponding ticket or notification template, using at least a subset of the information and payload data associated with the selected message to populate the generated item. At 925, the generated helpdesk ticket or notification can be submitted or sent.

A second action illustrated is allowing the searching entity or user viewing the search results to access the local PI component and/or local PI monitor associated with the selected message. At 930, a request for access to the local PI component and/or local PI monitor associated with the selected message is received. At 935, remote access to the local PI component and/or local PI monitor is requested and established, for example, using one or more interfaces exposing functionality at the PI component. Once remote access is established, a remotely accessed view of the local PI component and/or local PI monitor may be presented and interacted within the central monitoring application.

Figure 10A:
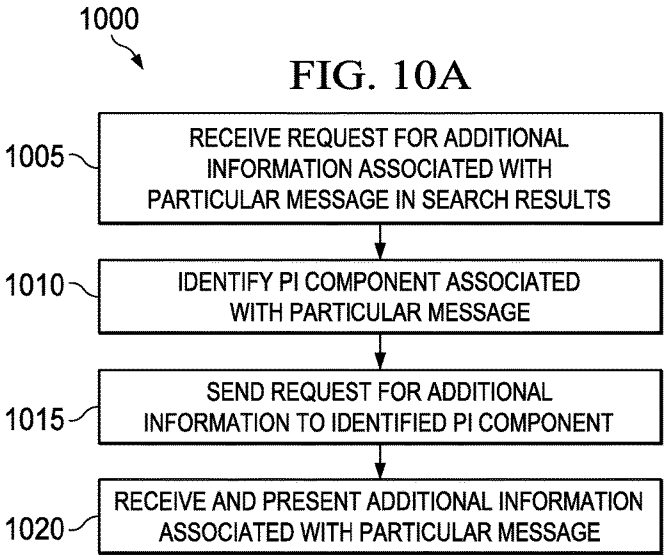
FIGS. 10A-B illustrate example methods for viewing additional information associated with a particular message included in a set of message search results.

FIG. 10A illustrates an example method 1000 providing the option to view additional information associated with a particular message included in the message search results from the perspective of the central monitoring application. At 1005, a request for additional information associated with the particular selected message in the message search results is received. In some instances, the search results may present only a subset of the message payload data and/or message metadata for a particular message. When users are interested in additional information, corresponding requests can be submitted via the central monitoring application. The message search can return a set of messages and their associated message details and attributes. The presentation of the results can display columns that are associated with the defined search attributes and corresponding result values. In some instances, the user can select a particular message within the search results and request additional message details, allowing additional payload attributes of the message to be reviewed.

At 1010, the PI component associated with the particular selected message is identified. At 1015, the request for additional information is sent to the identified PI component. At 1020, the additional information is received and presented. In some instances, no additional information may be available. In others, the requesting user may not be authorized to view at least a portion of the additional information.

Figure 10B:
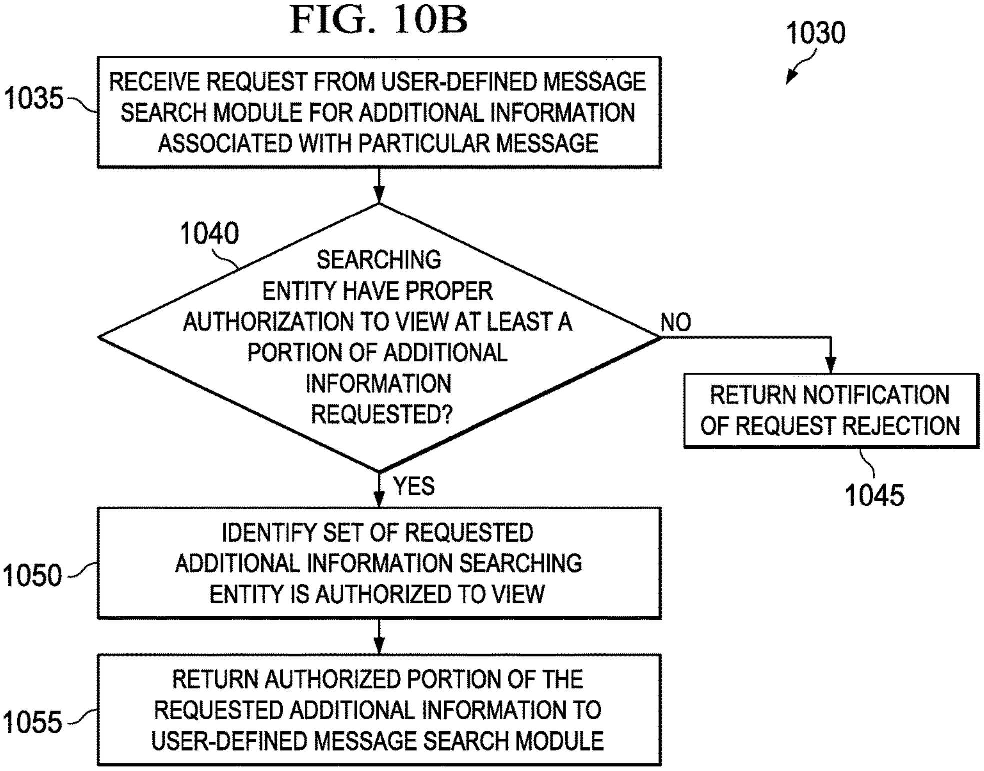

FIG. 10B illustrates an example method 1030, from the perspective of the PI component, of processing a request for providing additional information associated with a message from the search results. At 1035, a request from the central monitoring application or a related component (i.e., a user-defined message module) for additional information associated with a particular message is received. A determination is made at 1040 as to whether the user or searching entity associated with the request has the proper authorization to view at least a portion of the additional information requested. If not, then a notification of the rejected request is returned at 1045. If the requesting user or entity has the authorization to view at least a portion of the additional information, method 1030 continues at 1050. At 1050, the set of requested additional information that the searching entity or user is authorized to view is identified. In some instances, this may be all or a portion of the requested additional information. The authorized portion of the additional information is returned to the central monitoring application (and the user-defined message search module) at 1055.

Figure 11A:
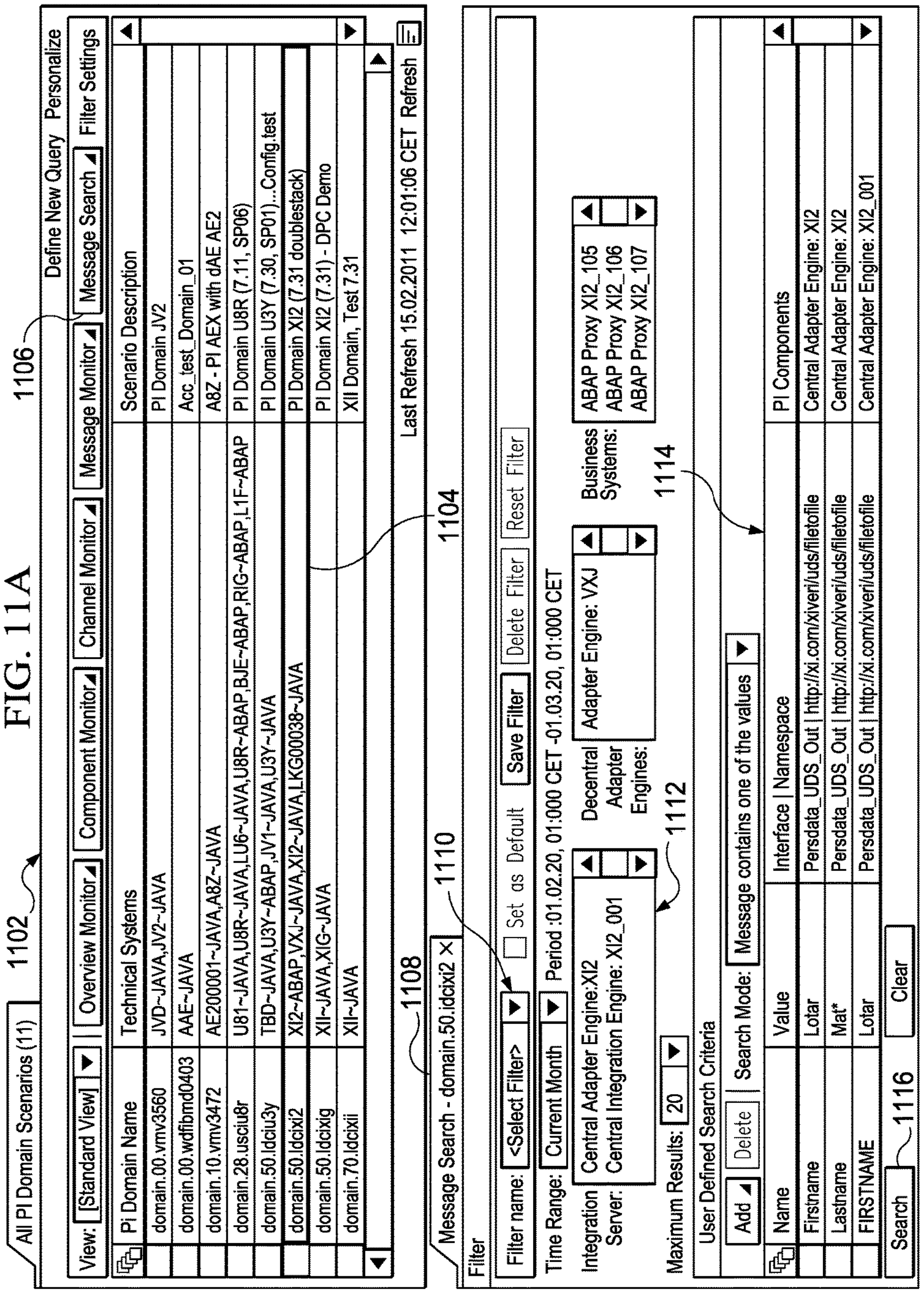

FIGS. 11A-E provide example screenshots of various dashboards and user interface presentations of data associated a centralized message search as described herein. FIG. 11A illustrates an example starting point for selecting a particular PI domain and one or more PI components therein to search, as well as specific message attributes to search on in one example. As illustrated, a starting interface 1102 is provided, as well as a list of PI domains available for searching. In the illustrated example, a particular PI domain 1104 is selected for message searching. Once selected, the button labeled "Message Search" 1106 can be activated, bringing up a second window 1108 for defining the search attributes and particular PI components for the message search. In some instances, one or more predefined filters 1110 can be used, where the filters may provide predefined sets of search attributes and/or selected PI components that may be used frequently for searching. Additional filters can be defined based on selected PI components and defined search attributes and criteria. In the illustrated example, two PI components 1112 from the integration server box are selected for the message search and a set of defined search attributes are defined as illustrated in user interface element 1114. Once the search attributes and PI components are selected, the message search can be executed by activating the search button 1116.

Figure 11B:
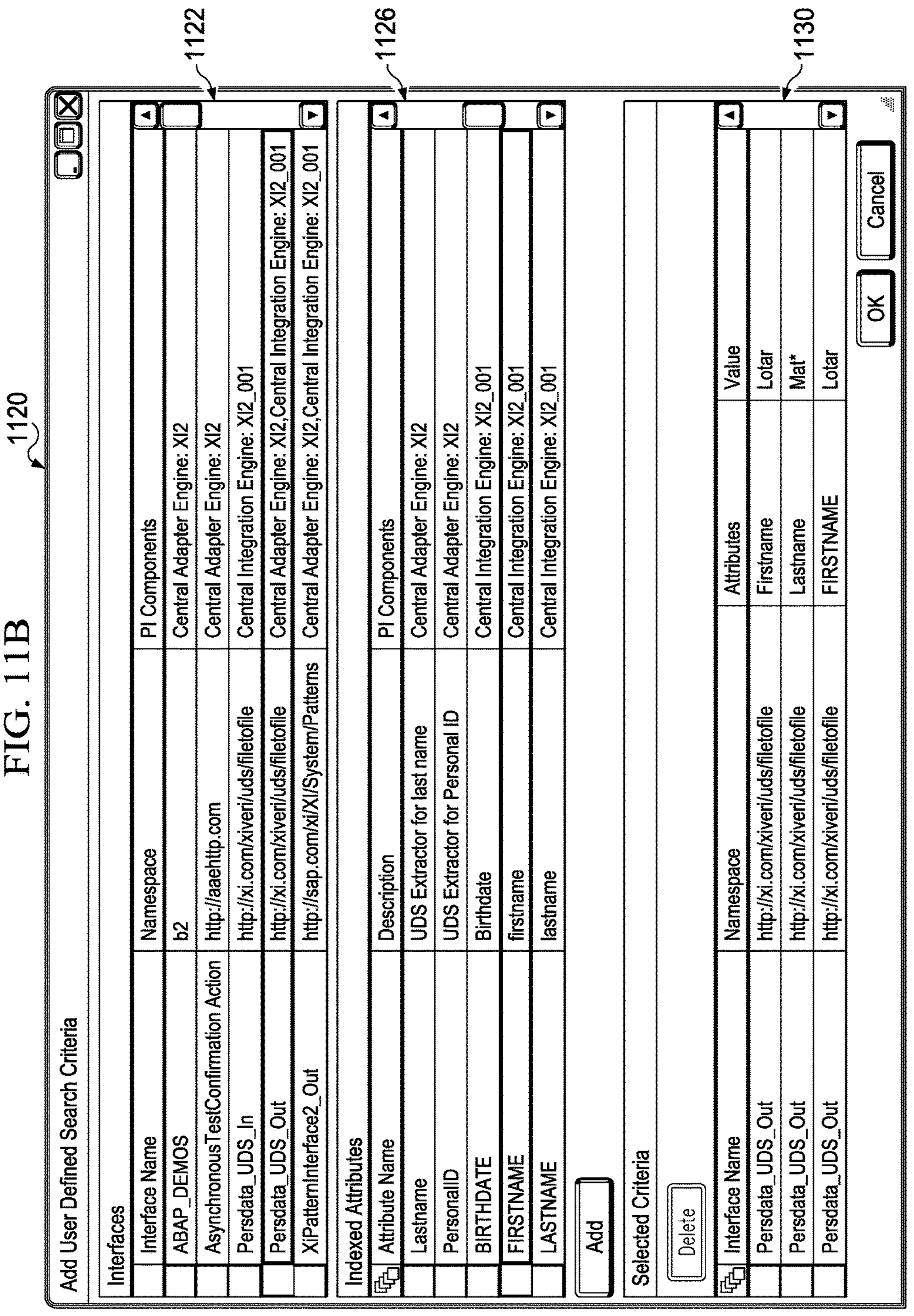

FIG. 11B illustrates an expanded view for adding specific search attributes to a message search. The user interface 1120 includes a set of interfaces in box 1122 and indexed, or searchable, attributes associated with the selected PI components in box 1126. The particular values associated with the selected attributes can be defined in box 1130 to define the particular search criteria of the message search.

FIG. 11C provides an example illustration of a dashboard 1136 providing a set of search result responsive to a submitted search. Box 1138 provides an overview describing on which PI components messages satisfying the search attributes were found. Box 1142 provides a list of the messages themselves, including a subset of the information defining the messages including, in some instances, message payload data. As illustrated, the first message 1146 is selected. Additional operations can be performed on the selected message using the "Create" button 1144 and the "Navigate To" button 1145.

Figures 1, 11D:
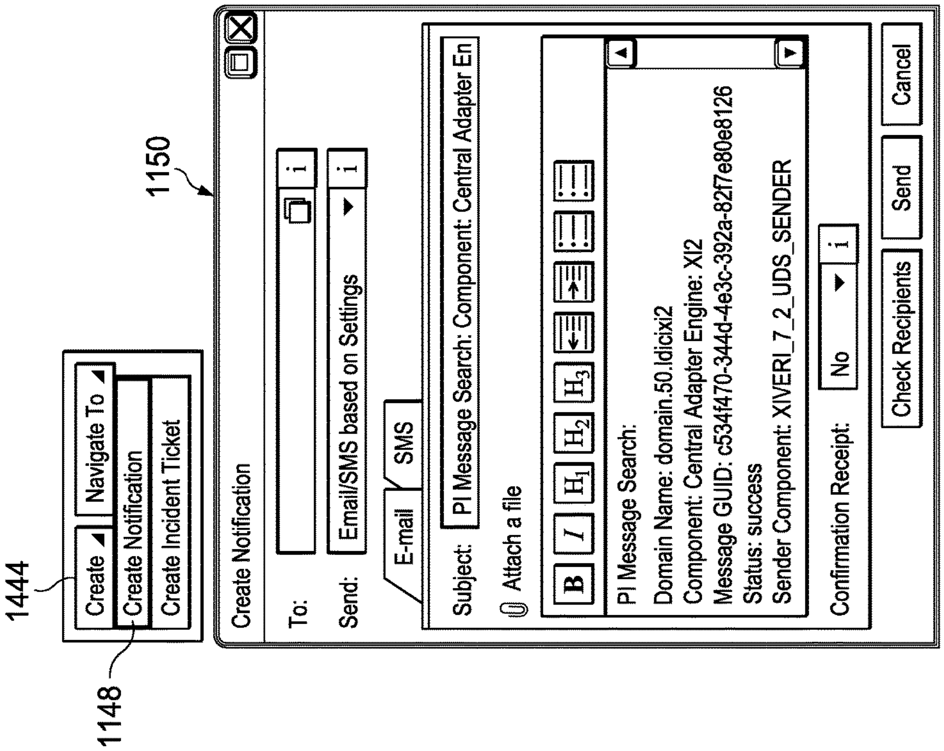
Figures 2, 11D:
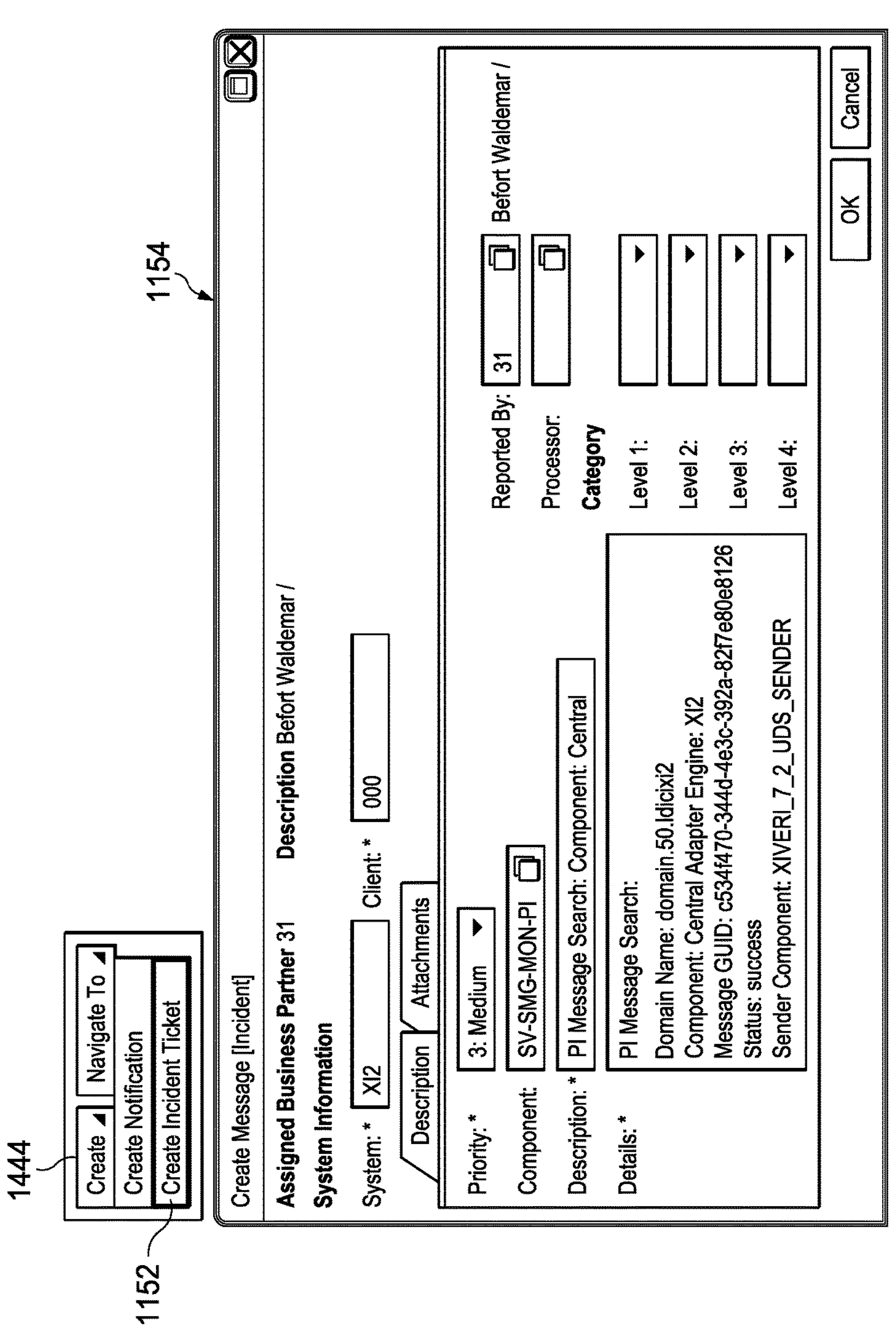

FIG. 11D illustrates the creation of a notification (as illustrated by the selection of 1148 and an example provided by box 1150) or an incident ticket (as illustrated by the selection of 1152 and an example provided by box 1154). Both the notification and the incident ticket can be populated with information associated with the selected message, including message payload data, where appropriate.

Figure 11E:
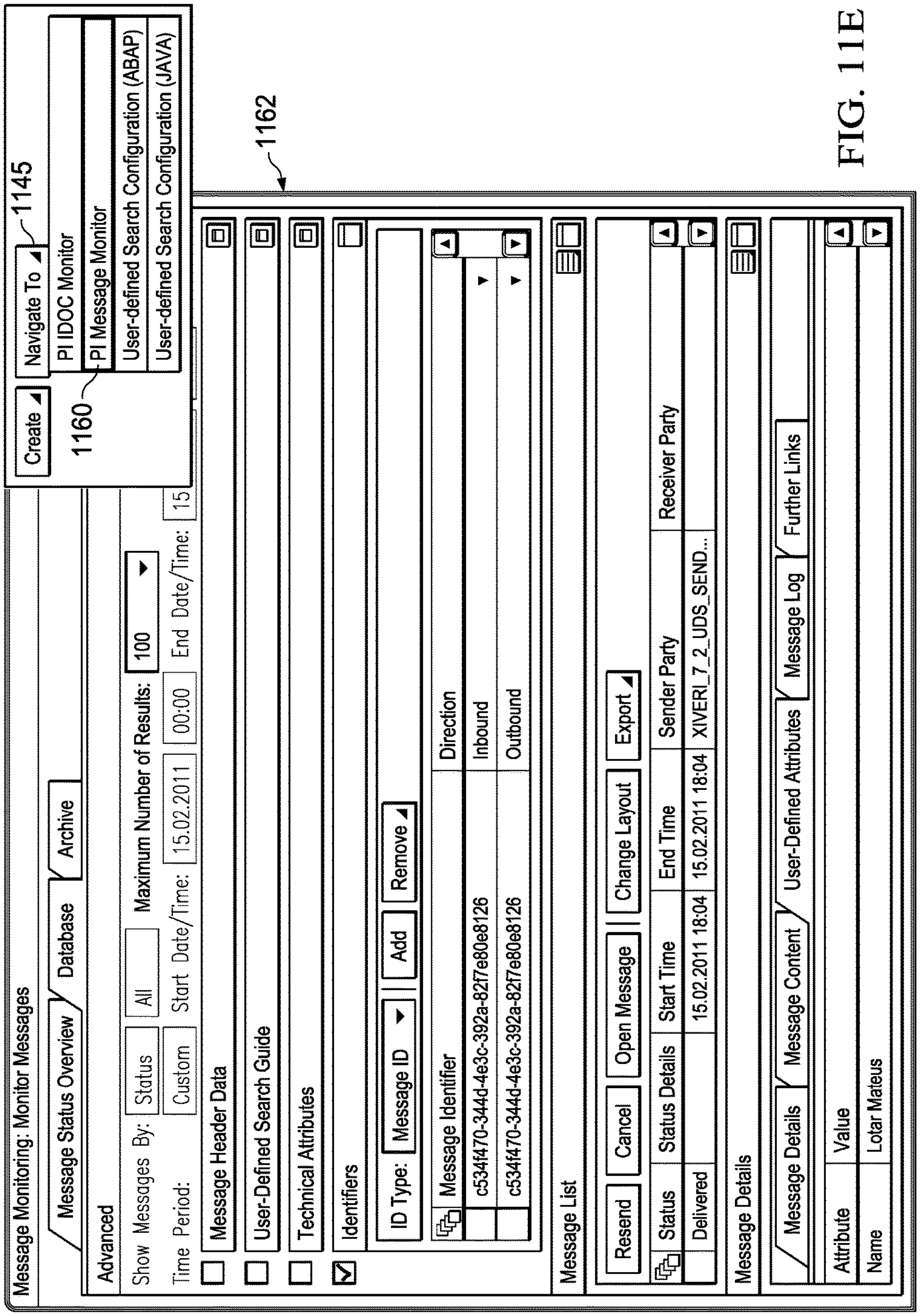

FIG. 11E illustrates an example of the "navigation to" functionality. As illustrated, a user interacting with the search results can select to navigate to the local PI message monitor associated with the selected message (by selecting 1160). The illustrated screen of FIG. 11E provides an example message monitoring screen 1162 as generated by the local PI message monitor at the PI component associated with the selected message. This view can provide more detailed information about a particular message than may be available by interacting with the search results alone.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by one or more processors for centralized message searching of business processes, the method comprising:

receiving a set of user-defined search attributes for searching messages within a process integration (PI) domain, where the PI domain includes a plurality of systems, and where each system includes at least one PI component, each search attribute associated with a corresponding value;

identifying at least one message corresponding to at least a portion of the set of received user-defined search attributes from the PI components within the PI domain, wherein each of the at least one identified message comprises a previously monitored message associated with a particular PI component, wherein identifying the at least one message includes:

searching local message stores associated with at least some of the PI components for the at least one message corresponding to at least the portion of the set of received user-defined search attributes; and identifying at least one metadata attribute related to a failure status associated with each of the at least one message responsive to the search, the metadata attribute separate from a corresponding payload of each of the at least one message responsive to the search;

retrieving information including the at least one metadata attribute associated with the at least one identified message corresponding to at least a portion of the set of received search attributes;

presenting an overview of the failure status associated with at least a portion of the retrieved information associated with the at least one identified message via a user interface;

receiving, via the presented overview, a request to view a payload of a particular message of the at least one identified message;

identifying the particular PI component associated with the particular message; and sending a request to retrieve the payload of the particular message from the identified PI component via an application programming interface (API) associated with the identified PI component.

2. The method of claim 1, wherein the at least one PI component includes at least one of an adapter engine or a proxy associated with an application system.

3. The method of claim 1, wherein the at least one PI component includes an integration engine.

4. The method of claim 1, wherein accessing the local message store associated with the at least one PI component included within the PI domain includes:

identifying an application programming interface (API) associated with a local message search application located at the PI component; and using the identified API to access functionality associated with the local message search application.

5. The method of claim 1, wherein the local message store includes at least one of a current message store or a message archive.

6. The method of claim 5, wherein the set of received user-defined search attributes includes an indication to search at least the message archives of each at least one PI component.

7. The method of claim 1, wherein presenting the overview includes generating at least one dashboard presentation of at least a portion of the retrieved information associated with the identified at least one message.

8. The method of claim 1, wherein sending the request to retrieve the payload of the particular message includes:

identifying a user associated with the request to view the payload of the particular message;

determining that the user associated with the request is properly authorized to view the payload of the particular message; and in response to the determination that the user associated with the request is properly authorized to view the payload of the particular message, sending the request via the API associated with the PI component corresponding to the particular message.

9. A non-transitory, tangible storage medium comprising computer readable instructions for causing one or more processors to perform operations comprising:

receiving a set of user-defined search attributes for searching messages within a process integration (PI) domain, where the PI domain includes a plurality of systems, and where each system includes at least one PI component, each search attribute associated with a corresponding value;

identifying at least one message corresponding to at least a portion of the set of received user-defined search attributes from the PI components within the PI domain, wherein each of the at least one identified message comprises a previously monitored message associated with a particular PI component, wherein identifying the at least one message includes:

searching local message stores associated with at least some of the PI components for the at least one message corresponding to at least the portion of the set of received user-defined search attributes; and identifying at least one metadata attribute related to a failure status associated with each of the at least one message responsive to the search, the metadata attribute separate from a corresponding payload of each of the at least one message responsive to the search;

retrieving information including the at least one metadata attribute associated with the at least one identified message corresponding to at least a portion of the set of received search attributes;

presenting an overview of the failure status associated with at least a portion of the retrieved information associated with the at least one identified message via a user interface;

receiving, via the presented overview, a request to view a payload of a particular message of the at least one identified message;

identifying the particular PI component associated with the particular message; and sending a request to retrieve the payload of the particular message from the identified PI component via an application programming interface (API) associated with the identified PI component.

10. The non-transitory, tangible storage medium of claim 9, wherein the at least one PI component includes at least one of an adapter engine or a proxy associated with an application system.

11. The non-transitory, tangible storage medium of claim 9, wherein the at least one PI component includes an integration engine.

12. The non-transitory, tangible storage medium of claim 9, wherein searching local message store associated with at least some of the PI components includes:

identifying an application programming interface (API) associated with a local message search application located at the PI component; and using the identified API to access functionality associated with the local message search application to search the local message store.

13. The non-transitory, tangible storage medium of claim 9, wherein the local message store includes at least one of a current message store or a message archive.

14. The non-transitory, tangible storage medium of claim 13, wherein the set of received user-defined search attributes includes an indication to search at least the message archives of each at least one PI component.

15. The computer program product of claim 9, wherein presenting the overview includes generating at least one dashboard presentation of at least a portion of the retrieved information associated with the identified at least one message.

16. The non-transitory, tangible storage medium of claim 9, wherein sending the request to retrieve the payload of the particular message includes:

identifying a user associated with the request to view the payload of the particular message;

determining that the user associated with the request is properly authorized to view the payload of the particular message; and in response to the determination that the user associated with the request is properly authorized to view the payload of the particular message, sending the request via the API associated with the PI component corresponding to the particular message.

17. A system, comprising:

one or more computers; and a computer-readable medium coupled to the one or more computers having instructions stored thereon which, when executed by the one or more computers, cause the one or more computers to perform operations comprising:

receiving a set of user-defined search attributes for searching messages within a process integration (PI) domain, where the PI domain includes a plurality of systems, and where each system includes at least one PI component, each search attribute associated with a corresponding value;

identifying at least one message corresponding to at least a portion of the set of received user-defined search attributes from the PI components within the PI domain, wherein each of the at least one identified message comprises a previously monitored message associated with a particular PI component, wherein identifying the at least one message includes:

searching local message stores associated with at least some of the PI components for the at least one message corresponding to at least the portion of the set of received user-defined search attributes; and identifying at least one metadata attribute related to a failure status associated with each of the at least one message responsive to the search, the metadata attribute separate from a corresponding payload of each of the at least one message responsive to the search;

retrieving information including the at least one metadata attribute associated with the at least one identified message corresponding to at least a portion of the set of received search attributes;

presenting an overview of the failure status associated with at least a portion of the retrieved information associated with the at least one identified message via a user interface;

receiving, via the presented overview, a request to view a payload of a particular message of the at least one identified message;

identifying the particular PI component associated with the particular message; and sending a request to retrieve the payload of the particular message from the identified PI component via an application programming interface (API) associated with the identified PI component.

18. The system of claim 17, wherein searching local message store associated with at least some of the PI components includes:

identifying an application programming interface (API) associated with a local message search application located at the PI component; and using the identified API to access functionality associated with the local message search application to search the local message store.

19. The system of claim 17, wherein the local message store includes at least one of a current message store or a message archive.

20. The system of claim 19, wherein the set of received user-defined search attributes includes an indication to search the message archives of each at least one PI component.

* * * * *